(12) United States Patent
Siminoff et al.

(10) Patent No.: US 10,762,767 B2
(45) Date of Patent: Sep. 1, 2020

(54) COMMUNICATING WITH LAW ENFORCEMENT AGENCIES USING CLIENT DEVICES THAT ARE ASSOCIATED WITH AUDIO/VIDEO RECORDING AND COMMUNICATION DEVICES

(71) Applicant: Amazon Technologies, Inc., Seattle, WA (US)

(72) Inventors: James Siminoff, Pacific Palisades, CA (US); Peter Gerstberger, Laguna Niguel, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/595,243

(22) Filed: Oct. 7, 2019

(65) Prior Publication Data
US 2020/0035086 A1    Jan. 30, 2020

Related U.S. Application Data

(63) Continuation of application No. 15/991,908, filed on May 29, 2018, now Pat. No. 10,475,330.
(Continued)

(51) Int. Cl.
*G08B 25/01* (2006.01)
*H04N 7/18* (2006.01)
(Continued)

(52) U.S. Cl.
CPC ..... *G08B 25/012* (2013.01); *G08B 13/19654* (2013.01); *G08B 25/009* (2013.01);
(Continued)

(58) Field of Classification Search
CPC ........... G08B 13/19654; G08B 25/009; G08B 25/012; G08B 25/08; H04N 7/185; H04N 7/186
See application file for complete search history.

(56) References Cited

U.S. PATENT DOCUMENTS 4,764,953 A    8/1988   Chern et al.
5,428,388 A    6/1995   von Bauer et al.
(Continued)

FOREIGN PATENT DOCUMENTS

CN    2585521 Y    11/2003
CN    2792061 Y    6/2006
(Continued)

*Primary Examiner* — Omeed Alizada
(74) *Attorney, Agent, or Firm* — Greenberg Traurig, LLP

(57) ABSTRACT

Communicating with law enforcement agencies using client devices that are associated with audio/video (A/V) recording and communication devices are provided. In one embodiments, a method for a client device for preventing redundant calls to an emergency call center is provided, the method comprising: receiving, at the client device, a notification, along with video footage associated with the notification, about an event generated by an A/V recording and communication device, the video footage captured by a camera of the A/V recording and communication device; receiving a request for contacting the emergency call center; informing one or more backend devices, in communication with the client device and a home security monitoring center that monitors a security system, of the received request to suppress a potential redundant call to the emergency call center from the home security monitoring center; and contacting the emergency call center.

20 Claims, 14 Drawing Sheets

Related U.S. Application Data

(60) Provisional application No. 62/513,296, filed on May 31, 2017.

(51) Int. Cl.
  *G08B 25/00* (2006.01)
  *G08B 25/08* (2006.01)
  *G08B 13/196* (2006.01)

(52) U.S. Cl.
  CPC .............. *G08B 25/08* (2013.01); *H04N 7/185* (2013.01); *H04N 7/186* (2013.01)

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0029335 A1* | 1/2015 | Kasmir .................. H04N 7/186 348/143 |
| 2015/0163463 A1 | 6/2015 | Hwang et al. |

FOREIGN PATENT DOCUMENTS

| | | |
|---|---|---|
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-157650 A | 6/2006 |
| JP | 2006-262342 A | 9/2006 |
| JP | 2009-008925 A | 1/2009 |
| WO | 9826389 A1 | 6/1998 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

COMMUNICATING WITH LAW ENFORCEMENT AGENCIES USING CLIENT DEVICES THAT ARE ASSOCIATED WITH AUDIO/VIDEO RECORDING AND COMMUNICATION DEVICES

CROSS-REFERENCE TO RELATED APPLICATIONS

This application is a continuation of application Ser. No. 15/991,908, filed on May 29, 2018, which claims priority to provisional application Ser. No. 62/513,296, filed on May 31, 2017. The entire contents of the priority applications are incorporated by reference as if fully set forth.

TECHNICAL FIELD

The present embodiments relate to audio/video (A/V) recording and communication devices, including A/V recording and communication doorbells and A/V recording and communication security cameras. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells and security cameras, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present communicating with law enforcement agencies using client devices that are associated with audio/video recording and communication devices now will be discussed in detail with an emphasis on highlighting the advantageous features. These embodiments depict examples the novel and non-obvious communicating with law enforcement agencies using client devices that are associated with audio/video recording and communication devices, which are for illustrative purposes only. These drawings include the following figures, in which like numerals indicate like parts.

DETAILED DESCRIPTION

Figure 1:
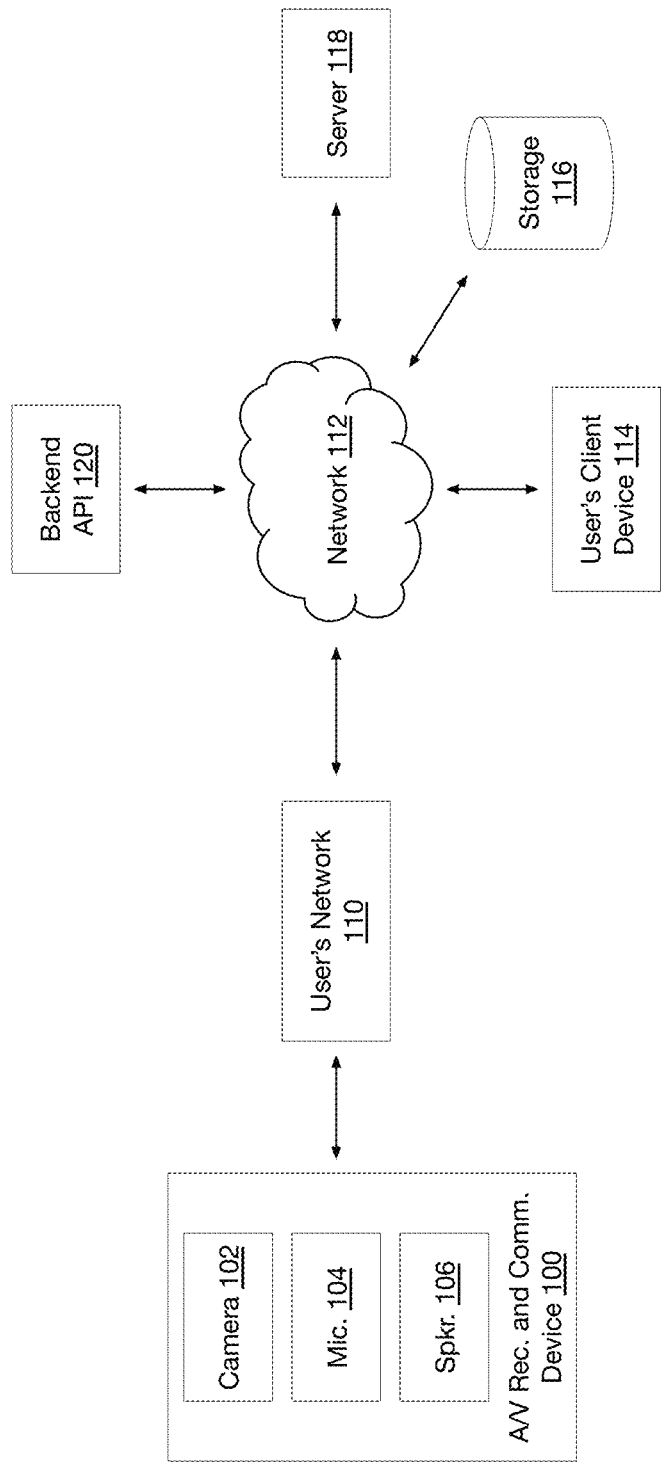
FIG. 1 is a functional block diagram illustrating a system for providing notifications to one or more users, and for streaming and storing A/V content captured by an A/V recording and communication device, according to various aspects of the present disclosure.

The various embodiments of the present communicating with law enforcement agencies using client devices that are associated with audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that conventional client-device applications for A/V recording and communication devices do not provide direct access to law enforcement agencies' information (e.g., contact information for a local police department), nor do they allow a user to contact an emergency number directly from the application. A conventional application for a client device associated with an A/V recording and communication device may provide a user with video footage of a recent event, such as a motion detection, that is recorded by a camera of the A/V recording and communication device. However, the user may not be able to directly access (e.g., within the application executing on the client device) the contact information of a law enforcement agency in case he/she wishes to report a person or object seen in the video, nor can the user call an emergency (or non-emergency) telephone number directly from a client-device application that is associated with the A/V recording and communication device (e.g., the same application that plays the video recorded by the A/V recording and communication device). To report an emergency (e.g., a burglary in progress as seen in a video), the user may have to exit the client-device application that is playing the video, open a separate phone application (or a similar application that has a dialer interface), and then dial an emergency number (e.g., 911). To report a non-emergency event (e.g., a suspicious person seen in a video), a user may have to first search for the contact information of a local police department, then open a separate phone application (or a similar application that has a dialer interface), and then contact the local police department (if he or she was able to find the contact information). The processes of exiting the client-device application that is playing the video, searching for the contact information of a local police department, and then contacting the local police department, or, alternatively, dialing an emergency number, can be very time consuming, perhaps costing precious seconds or minutes in situations where dispatching local police as quickly as possible could be the difference between life or death.

Some aspects of the present embodiments solve this problem by providing the user of a client-device application for A/V recording and communication devices with the contact information of one or more law enforcement agencies, while the user is interacting with the events generated by one or more A/V recording and communication devices (e.g., while the user is viewing events, video footage of events, etc.). Some of the present embodiments may provide a user with an option (e.g., a panic button) to contact a law enforcement agency directly from an application that is associated with the A/V recording and communication devices. Some aspects of the present embodiments may allow the user to share the video footage of events with one or more law enforcement agencies (e.g., while the video footage is presented to the user). For example, in some of the present embodiments, an application that executes on a client device that is associated with a set of A/V recording and communication devices may display a summary of events on a display of the client device. (As used herein, the term "set" should be understood to include any number greater than zero; Thus a set may in some embodiments include just a single member.) When a user requests to view one of the events generated by one of the A/V recording and communication devices, the application may present to the user the video footage that is associated with the event (e.g., the video footage that is recorded by a camera of the A/V recording and communication device when the event was triggered). Some aspects of the present embodiments may allow the user to request, and view, the contact information of one or more law enforcement agencies before, during, and/or after the video footage of the event is presented to the user on the client device. One aspect of the present embodiments may provide an option to contact an emergency call center (e.g., for the police, for the fire department, etc.) directly from the client-device application. Selecting this option, in some of the present embodiments, may connect the user to a local 911 center that serves an area in which the A/V recording and communication device that recorded the video footage is located. Another aspect of the present embodiments may allow a user to transmit the video footage to at least one law enforcement agency (e.g., to one or more servers associated with the law enforcement agency) directly from the application executing on the client device that is associated with the A/V recording and communication device(s).

Another aspect of the present embodiments includes the realization that a property associated with one or more A/V recording and communication devices may also be protected by a home security/alarm system. In at least some implementations, the A/V recording and communication device(s) may communicate with, and/or be integrated into, the home security/alarm system (e.g., through wireless and/or wired networks). When a user receives a remote notification, on a client device, from the A/V recording and communication device, streaming video associated with the notification may show the user that an emergency situation, such as an imminent break-in, is unfolding at the property where the A/V recording and communication device is located. The user may then make a call to an emergency call center, such as a 911 dispatch center or a police department, in order to summon law enforcement to the property. As the break-in progresses, however, the home security/alarm system may be triggered (e.g., when the burglar(s) kicks in the front door). The home security/alarm system may be configured to automatically call emergency services when a break-in or other emergency is detected. If the user has already called emergency services after receiving the notification from the A/V recording and communication device, then the call automatically made by the home security/alarm system is redundant. Redundant calls to emergency services to report the same incident unnecessarily burden emergency services, especially when it is not immediately apparent to the emergency services dispatcher(s) that the second call (from the home security/alarm system) relates to the same incident already reported by the user.

Some aspects of the present embodiments solve this problem by facilitating communication among A/V recording and communication devices, home security/alarm systems, and a monitoring center that monitors the home security/alarm system installed at the property. In particular, the present embodiments enable suppression of redundant communications to an emergency call center (e.g., redundant calls made by the monitoring center and/or by a user of one or more A/V recording and communication devices installed at the same property). For example, when the user of the A/V recording and communication device(s) requests a phone call to be made to an emergency call center (e.g., directly from an application executing on a client device that is associated with the A/V recording and communication device(s)), some of the present embodiments may communicate with the home security/alarm system monitoring center (i) to inform the monitoring center that the user is contacting the emergency call center, (ii) to determine whether the monitoring center has already contacted the emergency call center, and (iii) to inform the user if the monitoring center has already contacted the emergency call center. Some aspects of the present embodiments may send a notification to the user if the monitoring center has already contacted the emergency call center and may request an acknowledgment from the user before placing the phone call to the emergency call center (when the user has requested that such a call be placed).

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments include an A/V recording and communication device 100 (e.g., a video doorbell, a security camera, etc.). While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera, as described below with reference to FIG. 3, may include a substantially all of the structure and functionality of the doorbells described herein, but without the front button 133 (FIG. 2) and its related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as memory (e.g., volatile and/or non-volatile memory), a housing, one or more motion sensors (and/or other types of sensors), a button (e.g., a doorbell button), etc.

Additionally, the present disclosure provides numerous examples of methods and systems including A/V recording and communication devices that are powered by a connection to AC mains, but the present embodiments are equally applicable for A/V recording and communication devices that are battery powered. The A/V recording and communication device 100 may further include similar componentry and/or functionality as the wireless communication doorbells described in U.S. Pat. No. 9,584,775 (application Ser. No. 14/499,828) and U.S. Patent Publication No. 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The user's network 110 may also be connected to other A/V recording and communication devices, such as the A/V recording and communication device 100, and/or other types of alert devices (e.g., in-home and outside alert devices) which are not shown in FIG. 1. An alert device, in some of the present embodiments, comprises a device that is capable of providing audible and/or visual alerts. Some examples of alert devices may include, but not limited to, a speaker capable of generating different sounds and/or verbal warnings, a light (e.g., a smart LED light bulb) capable of emitting light in different colors, etc.

The A/V recording and communication device 100 may also communicate with one or more remote storage device(s) 116 (may be referred to interchangeably as "cloud storage device(s)"), one or more servers 118, and/or a backend API (application programming interface) 120 via the network 110 (e.g., a personal wired or wireless network) and the network 112 (e.g., Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence using the camera 102, one or more motion sensors (not shown), and/or by detecting that the visitor has depressed a button (e.g., a doorbell button) on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, a two-way audio communication session may then be established between the visitor and the user through the A/V recording and communication device 100 and the user's client device 114. The user may view the visitor throughout the duration of the call, but the visitor cannot see the user in some embodiments. In some other embodiments, the A/V recording and communication device 100 may include a display screen, through which the visitor can also see the user (e.g., when the user wishes so). In some of the present embodiments, in addition to the above-described alert, a visual and/or verbal notification may be provided to any persons present at the property (e.g., when the visitor is determined to pose a threat, when the user has shown a higher level of interest in the visitor, etc.).

The video images captured by the camera 102 of the A/V recording and communication device 100 (and the audio captured by the microphone 104) may be uploaded to the cloud and recorded on the remote storage device 116. In some embodiments, the video and/or audio may be recorded on the remote storage device 116 even if the user chooses to ignore the alert sent to his or her client device 114.

With further reference to FIG. 1, the system may further comprise a backend application programming interface (API) 120 including one or more components. A backend API may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

As an example, in some of the present embodiments one or more API servers may receive (e.g., from the A/V recording and communication device 100) captured images and/or biometric data of a person at an entry of a property and use the received images/data to determine whether the person poses a threat or not. One or more of these backend servers may employ a set of computer vision processes (e.g., face recognition, iris recognition, or any other biometrics recognition process) and one or more databases (e.g., a database for convicted felons, registered sex offenders, etc.) to recognize and report the severity of the threat (e.g., the threat level associated with the person).

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
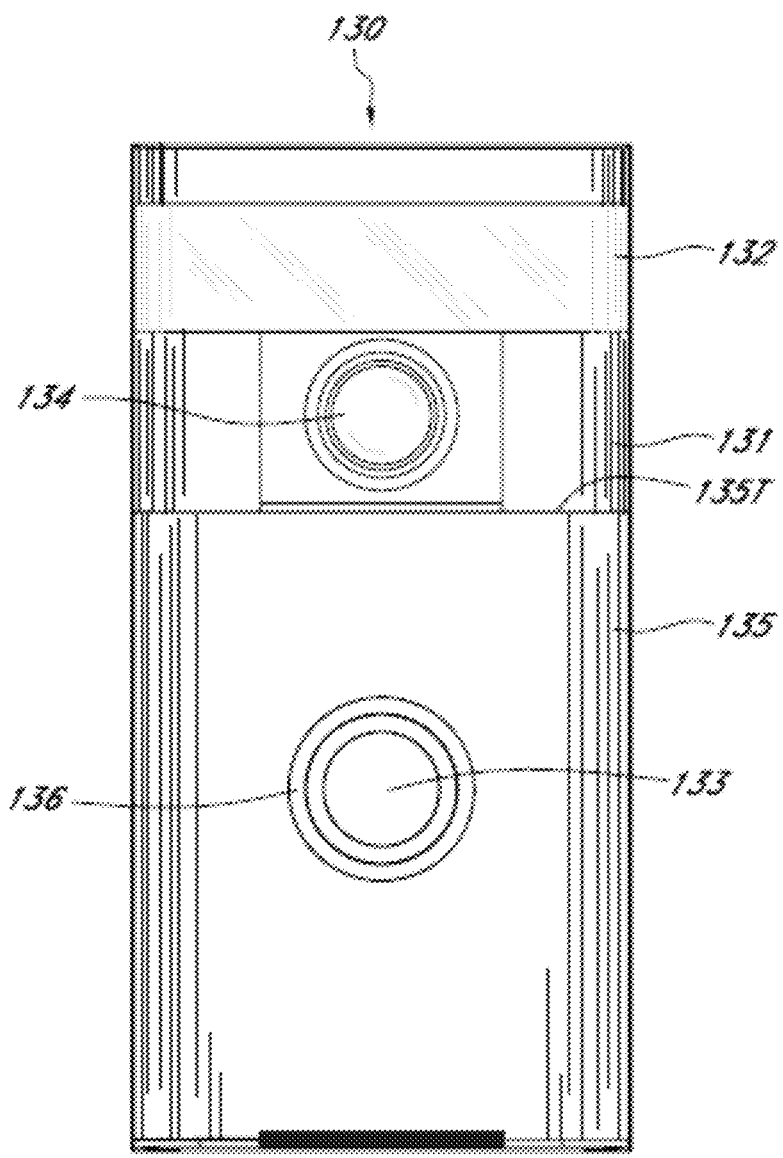
FIG. 2 is a front view of an A/V recording and communication doorbell, according to an aspect of the present disclosure.

FIG. 2 illustrates an A/V recording and communication doorbell (also referred to as a video doorbell, or simply a doorbell, in some embodiments), according to an aspect of the present disclosure. FIG. 2 illustrates that the front of the video doorbell 130 includes a front button 133, a faceplate 135, and a light pipe 136. The button 133 may make contact with a button actuator (not shown) located within the doorbell 130 when the button 133 is pressed by a visitor. When pressed, the button 133 may trigger one or more functions of the doorbell 130, as further described below. The front button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's) 156 (FIG. 13), contained within the doorbell 130. In some aspects of the present embodiments when the battery 166 of the doorbell 130 is recharged through a connection to AC mains power, the LEDs 156 may emit light to indicate that the battery 166 is being recharged.

With further reference to FIG. 2, the doorbell 130 further includes an enclosure 131 that engages the faceplate 135 in some aspects of the present embodiments. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described above and below.

Figure 3:
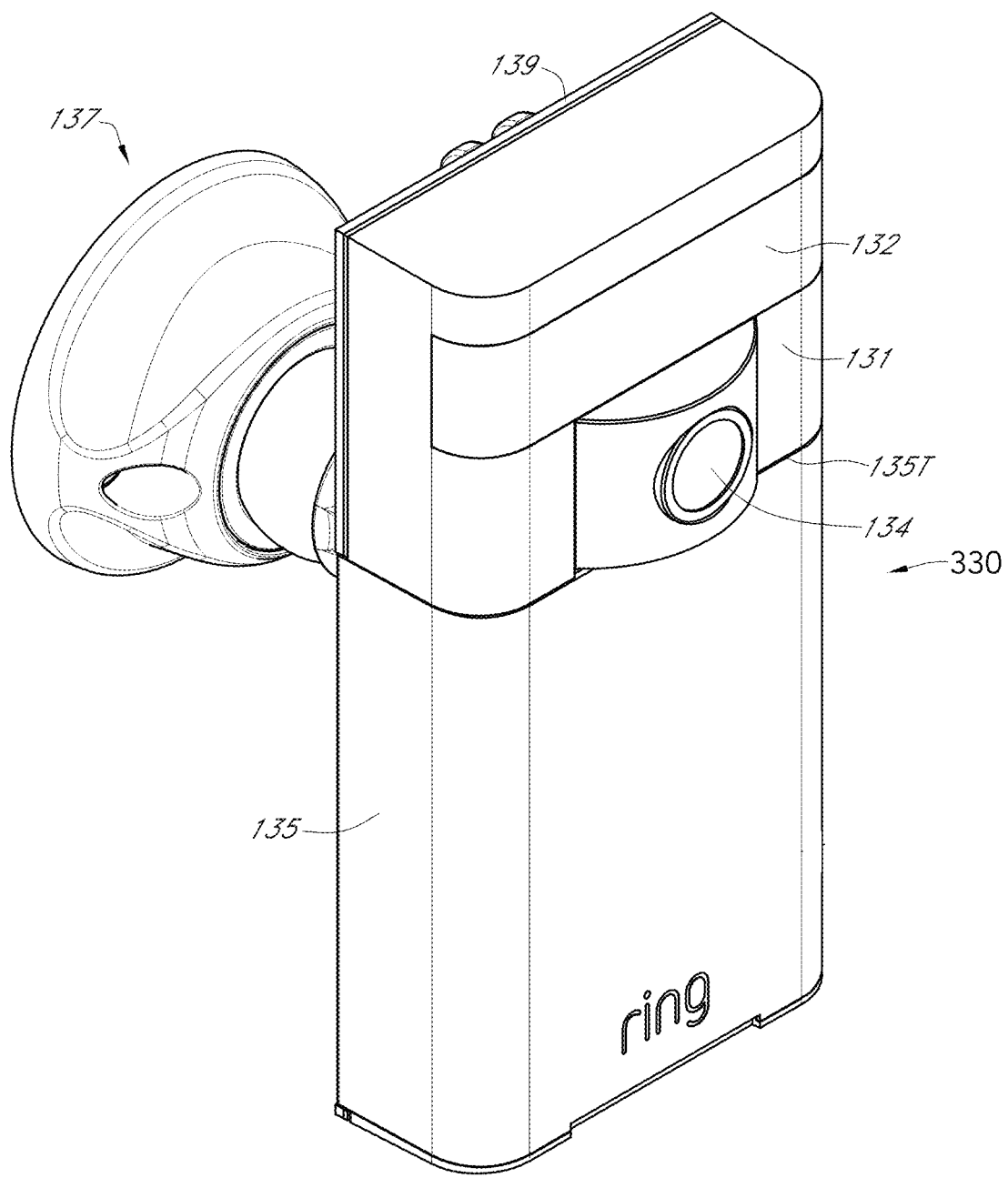
FIG. 3 is an upper front perspective view of an A/V recording and communication security camera, according to an aspect of the present disclosure.

FIG. 3 is an upper front perspective view of an A/V recording and communication camera (also referred to as a security camera in some embodiments), according to an aspect of the present embodiments. This figure illustrates that the security camera 330, similar to the video doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the security camera 330. However, unlike the video doorbell 130, the security camera 330 does not include any front button 133 for activating the doorbell. The faceplate 135 may comprise any suitable material, including, without limitation, metals, such as brushed aluminum or stainless steel, metal alloys, or plastics. The faceplate 135 protects the internal contents of the security camera 330 and serves as an exterior front surface of the security camera 330.

With continued reference to FIG. 3, the enclosure 131 engages the faceplate 135 and abuts an upper edge 135T of the faceplate 135. As discussed above with reference to FIG. 2, in alternative embodiments, one or more gaps between the enclosure 131 and the faceplate 135 may facilitate the passage of sound and/or light through the security camera 330. The enclosure 131 may comprise any suitable material, but in some embodiments the material of the enclosure 131 preferably permits infrared light to pass through from inside the security camera 330 to the environment and vice versa. The security camera 330 further includes a lens 132. Again, similar to the video doorbell 130, in some embodiments, the lens may comprise a Fresnel lens, which may be patterned to deflect incoming light into one or more infrared sensors located within the security camera 330. The security camera 330 further includes a camera 134, which captures video data when activated, as described above and below.

With reference to FIG. 3, the enclosure 131 may extend from the front of the security camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the security camera 330 and serves as an exterior rear surface of the security camera 330. The faceplate 135 may extend from the front of the security camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 3, the security camera 330 further comprises a mounting apparatus 137. The mounting apparatus 137 facilitates mounting the security camera 330 to a surface, such as an interior or exterior wall of a building, such as a home or office. The faceplate 135 may extend from the bottom of the security camera 330 up to just below the camera 134, and connect to the back plate 139 as described above. The lens 132 may extend and curl partially around the side of the security camera 330. The enclosure 131 may extend and curl around the side and top of the security camera 330, and may be coupled to the back plate 139 as described above. The camera 134 may protrude from the enclosure 131, thereby giving it a wider field of view. The mounting apparatus 137 may couple with the back plate 139, thereby creating an assembly including the security camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 4:
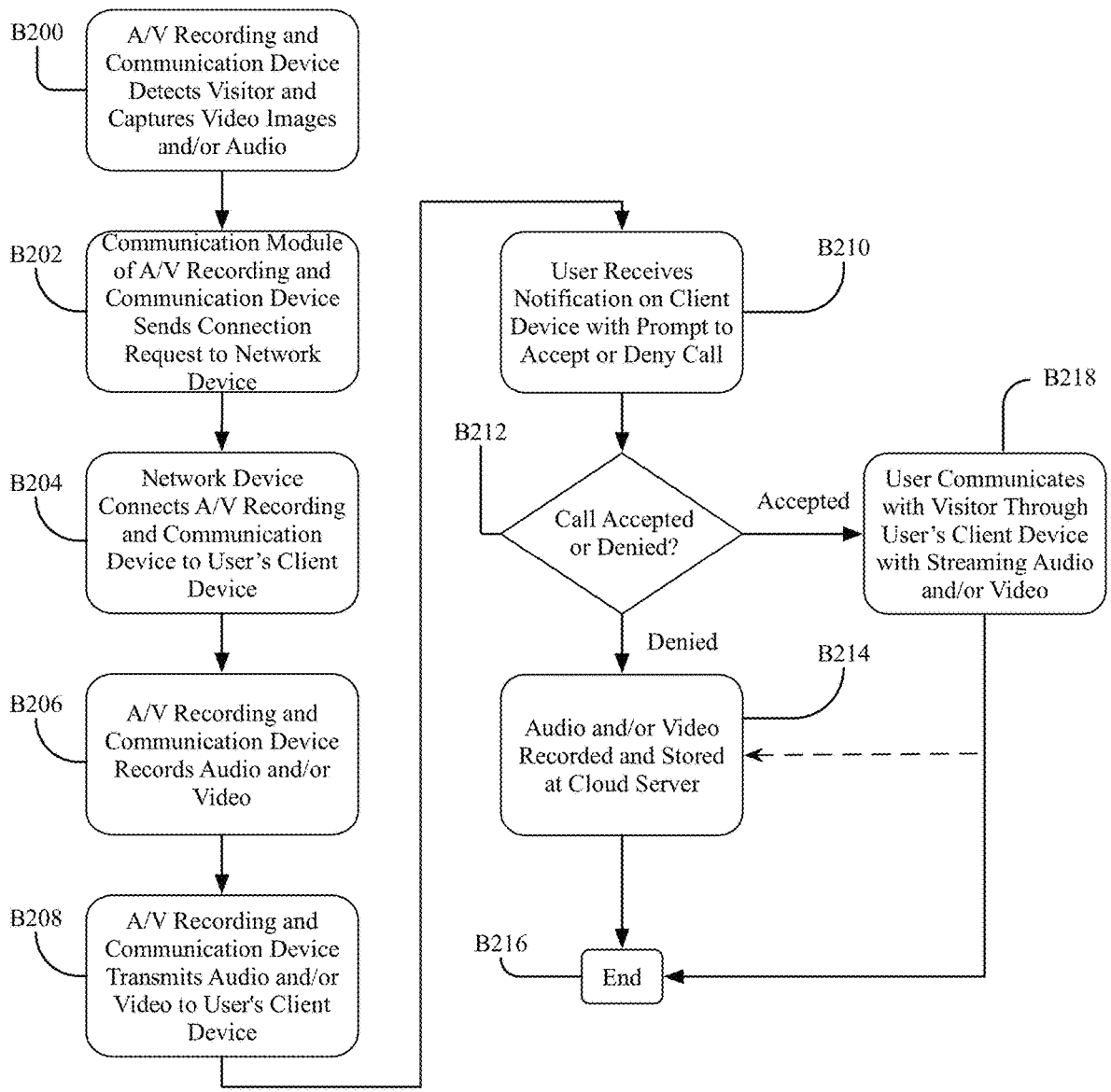
FIG. 4 is a flowchart illustrating a process for streaming and storing A/V content from an A/V recording and communication device, according to various aspects of the present disclosure.

FIG. 4 is a flowchart illustrating a process for streaming and storing A/V content from the A/V recording and communication device 100 (e.g., the video doorbell 130, the security camera 330, etc.), according to various aspects of the present disclosure. At block B200, the A/V recording and communication device 100 detects a visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor(s), and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, e.g., via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114, e.g., through the user's network 110 and the network 112. At block B206, the A/V recording and communication device 100 may record available audio and/or video data using the camera 102, the microphone 104, and/or any other device/sensor available. At block B208, the audio and/or video data is transmitted (e.g., streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification (or call), then at block B218 the user can communicate with the visitor through the user's client device 114 while audio and/or video data captured by the camera 102, the microphone 104, and/or other devices/sensors is streamed to the user's client device 114. In some of the present embodiments it is up to the user to enable the visitor to hear the user's voice (or to see a video of the user in some embodiments) by selecting/ unselecting a voice and/or video option during the communication session. At the end of the call, the user may terminate the connection between the user's client device 114 and the A/V recording and communication device 100 and the communication session ends at block B216. In some embodiments, the audio and/or video data may be recorded and stored at a cloud server (block B214) even if the user accepts the notification and communicates with the visitor through the user's client device 114.

The specific operations of the above-described process may not be performed in the exact order shown and described. For example, in some aspects of the present embodiments block B210 may be performed before block B208. That is, the A/V recording and communication device 100 may send a notification (e.g., upon detecting the visitor's presence) to the user (e.g., to the user's client device 114) before transmitting the audio and/or video data to the client device 114 (e.g., through the user's network 110 and the network 112). Furthermore, the specific operations may not be performed in one continuous series of operations, and different specific operations may be performed in different embodiments. Additionally, the process could be implemented using several sub-processes, or as part of a larger macro process.

As described above, conventional client-device applications for A/V recording and communication devices do not allow users to have direct access to law enforcement agencies' information (e.g., contact information for a local police department), nor do these applications allow the users to place a call to an emergency number (e.g., a 911 call) directly from the application. A conventional application for a client device associated with an A/V recording and communication device may provide a user with video footage of a recent event, such as a motion detection or a doorbell activation, that is recorded by a camera of the A/V recording and communication device. However, the user may not be able to have direct access (e.g., within the application executing on the client device) to contact information of a law enforcement agency in case he/she wishes to report a person or object seen in the video, nor is the user able to call an emergency (or non-emergency) telephone number directly from a client-device application that is associated with the A/V recording and communication device (e.g., the application that plays back the video recorded by the A/V recording and communication device). To report an emergency (e.g., a burglary in progress as seen in a video), the user may have to exit the client-device application that is playing the video, open a separate phone application (or a similar application that has a dialer interface), and then dial an emergency number. To report a non-emergency event (e.g., a person acting in a suspicious manner as seen in a video), a user may have to first search for the contact information of a local police department, then open a separate phone application (or a similar application that has a dialer interface), and then contact the local police department (if he or she was able to find the contact information). The processes of exiting the client-device application that is playing the video, searching for the contact information of a local police department, and then contacting the local police department, or, alternatively, dialing an emergency number, can be very time consuming, perhaps costing precious seconds or minutes in situations where dispatching local police as quickly as possible could be the difference between life or death.

The present embodiments solve this problem by providing user access to the contact information of one or more local law enforcement agencies while the user is interacting with the events generated by one or more A/V recording and communication devices (e.g., while the user is viewing a live event or recorded video footage of an earlier event, etc.). Some of the present embodiments may provide a user with an option (e.g., a panic button) to contact an emergency call center directly from an application that is associated with the A/V recording and communication devices. Some aspects of the present embodiments may allow the user to share the video footage of events with one or more law enforcement agencies (e.g., while the video footage is presented to the user). For example, in some of the present embodiments, an application that executes on a client device that is associated with a set of A/V recording and communication devices may display a summary of events on a display of the client device. When a user requests to view one of the events generated by one of the A/V recording and communication devices, the application may present to the user the video footage that is associated with the event (e.g., the video footage that is recorded by a camera of the A/V recording and communication device when the event was triggered).

Some aspects of the present embodiments allow the user to request, and view, the contact information of one or more local law enforcement agencies before, during, and/or after the video footage of the event is presented to the user on the client device. One aspect of the present embodiments may provide an option to contact an emergency call center (e.g., for the police, for the fire department, etc.) directly from the client-device application. Selecting this option, in some of the present embodiments, may connect the user to a local 911 center that serves an area in which the A/V recording and communication device that recorded the video footage is located. Another aspect of the present embodiments may allow a user to transmit video footage to at least one law enforcement agency (e.g., to one or more servers associated with the law enforcement agency) directly from the application executing on the client device that is associated with the A/V recording and communication device(s).

Figure 5:
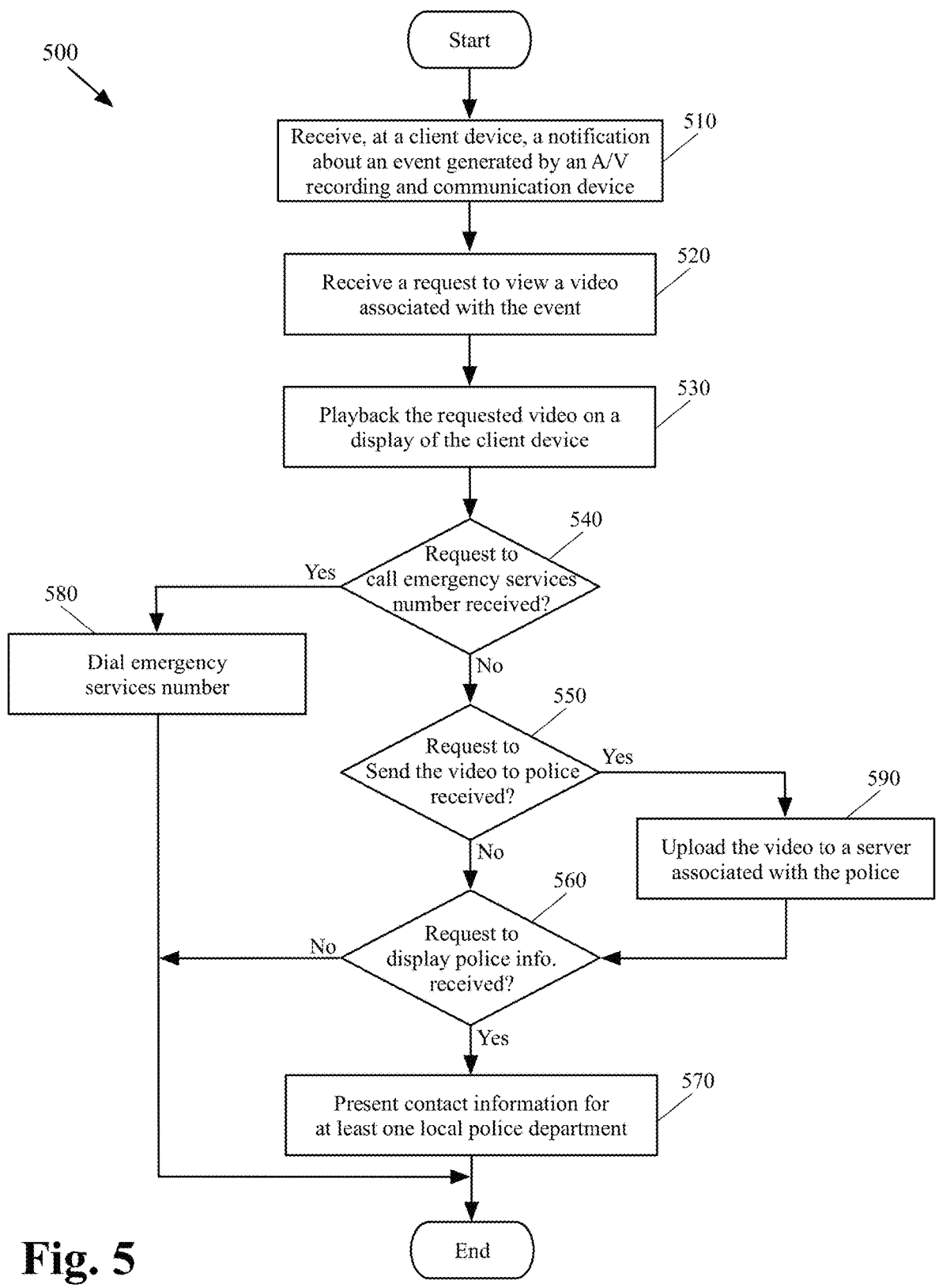
FIG. 5 is a flowchart illustrating a process that provides a user of a client device with different options for communicating with law enforcement agencies, while video footage of an event generated by an A/V recording and communication device associated with the client device is presented to the user, according to some aspects of the present disclosure.

FIG. 5 is a flowchart illustrating a process 500 that provides a user of a client device with different options for communicating with law enforcement agencies, while video footage of an event generated by an A/V recording and communication device associated with the client device is presented to the user, according to some aspects of the present embodiments. In some of the present embodiments, the process 500 may be performed by an application that executes on a client device (e.g., any of the client devices 114, 850 described herein). In alternative embodiments, some parts of the process 500 may be performed by an application that runs on a client device and some other parts of the process 500 may be performed by one or more backend devices (e.g., server(s) or API(s), such as the server(s) 118 or API(s) 120 described herein). For example, in some aspects of the preset embodiments, operations 510-570 are performed on a client device, while operations 580-590 are performed on a backend server.

With reference to FIG. 5, the process 500 initiates at block 510 by receiving, at a client device, a notification about an event generated by an A/V recording and communication device. As described above, when an A/V recording and communication device detects a visitor's presence, the A/V recording and communication device may generate an alert (or notification) and send the alert to the client device, e.g., via a backend device, such as a server. The A/V recording and communication device may detect the visitor's presence using a camera of the A/V recording and communication device, and/or one or more motion sensors of the device (e.g., passive infrared (PIR) sensors), or any other means that may trigger/activate the device (e.g., by pushing a doorbell button when the device is a doorbell).

With further reference to FIG. 5, at block 520, the process 500 may receive a request (e.g., from the user who receives the notification) to view the video footage associated with the event. For example, the user may open an application executing on a client device to view the video footage. The user may also directly select the notification received for the event to view the video footage of the event. In response to the request, at block 530, some of the present embodiments may transmit a video stream recorded for the event to the client device and playback the video on the display of the client device. During the playback of the video, the user may wish to communicate with law enforcement authorities, or other emergency services, about event(s) and/or person(s) and/or object(s) observed in the video. For example, when a user observes a suspicious person and/or activity in a video, the user may wish to notify the local police about the suspicious person and/or activity by sending the video footage to the police and/or by calling the police to inform them about the person and/or activity. As another example, a user may wish to call the police emergency number when the user notices, in the video, that a serious crime is in progress or may be about to occur. In another example, a user may see in the video a non-criminal emergency situation, such as a fire or a person in need of medical attention.

At block 540, the process 500 determines whether a request for calling an emergency services number (e.g., a 911 call request, a police call request, etc.) is received. As discussed before, the user may wish to contact a police emergency number directly and without having to leave the application that presents the events and the video footage of the events on the client device. When the process determines that a request to place an emergency call is received, the process may dial (at block 580) an emergency number. In some aspects of the present embodiments, especially where the client device is a smartphone, the process may directly dial the emergency number, for example in cooperation with a telephone application executing on the client device. In other embodiments, the process may send a signal to a backend device to place the call, instead of dialing the number directly. The process then ends.

However, when the process determines that no request for emergency call is received, the process may determine, at block 550, whether a request for submitting the video footage to a law enforcement authority is received. When the process determines that a request is received, the process may upload the video footage (at block 590) to one or more devices (e.g., server(s) or APIs) associated with the law enforcement agency. Similar to the previous step, the process of some embodiments may send a signal to a backend device to upload the video, instead of uploading the video directly. The process may then proceed to block 560, which is described below.

With further reference to FIG. 5, when the process 500 determines (at block 550) that no request for submitting the video footage to a law enforcement authority is received, the process may determine (at block 560) whether a request for displaying contact information of a law enforcement agency (e.g., a local police department) is received. As described above, the user may wish to access the contact information of a local police department directly and without having to leave the application that presents the events and the video footage of the events on the client device. When the process 500 determines (at block 560) that no request for presenting the police contact information is received, the process may end. However, when the process determines that the user has requested the police contact information, the process may present, at block 570, the contact information (and any other necessary information) for one or more law enforcement agencies (e.g., a local police and/or sheriff's department) on the display of the client device. In some of the present embodiments the local police department, as described below with reference to FIG. 9, may be a police department that serves a region in which the A/V recording and communication device that has generated the event (and that has recorded the video associated with the event) is installed. After the contact information for one or more law enforcement agencies is displayed on the display of the client device, the process may then determine whether an input has been received to contact (e.g., dial a telephone number of) the one or more law enforcement agencies. If such an input has been received, the process may then dial the selected telephone number.

The specific operations of the process 500 may not be performed in the exact order shown and described. For example, in some aspects of the present embodiments, the order of blocks 540-560 may be different than what is shown in this example (e.g., block 560 may be performed before block 540, etc.). Furthermore, the specific operations may not be performed in one continuous series of operations, and different specific operations may be performed in different embodiments. For instance, a user may wish to contact the police emergency number, or to request the local police information, without first viewing the video footage of an event. Some aspects of the present embodiments may provide the user with an option (e.g., a button) to contact the police, or to receive the police contact information, when the user opens the application associated with the A/V recording and communication device(s) on a client device of the user. Additionally, in some embodiments, the process may determine (at block 550) whether a request for submitting the video footage to a law enforcement authority is received, even after the user has requested, at block 560, to see contact information for a law enforcement agency, and even after a call to the law enforcement agency has been placed.

Additionally, the process 500 of some embodiments may automatically upload video footage associated with a set of events to one or more law enforcement agency severs when the process determines (e.g., by performing a computer vision process on the video footage) that the video footage contains suspicious persons and/or activities (e.g., criminal activities). That is, some aspects of the present embodiments may transmit video footage that contains a suspicious person (e.g., a criminal) or event to the police server(s) without any user request (e.g., without receiving a request from a user to transmit the video to the police). As another example, the process 500, as described below with reference to FIG. 11, may perform a number of other operations after receiving a request to call an emergency number (at block 540) and before placing the call (at block 580), in some of the present embodiments.

Figure 6:
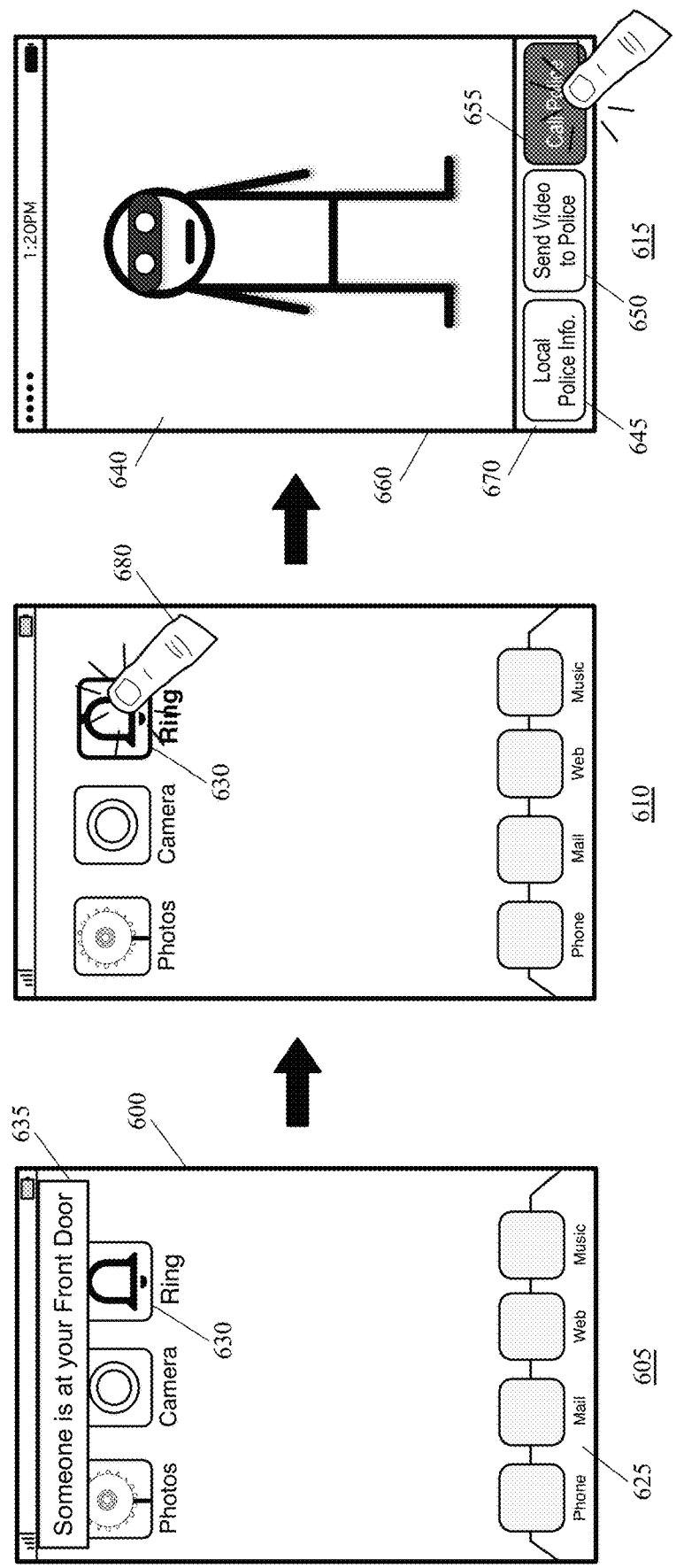
FIG. 6 illustrates an example graphical user interface (GUI) for placing an emergency call (e.g., to law enforcement) while a user is viewing a video stream associated with a live event, according to some aspects of the present disclosure.

FIG. 6 illustrates an example of placing an emergency call (e.g., to law enforcement), while a user is viewing the video stream associated with a live event, according to some aspects of the present embodiments. Specifically, FIG. 6 illustrates, through three different stages 605-615, a user receiving a notification 635 about an event generated by an A/V recording and communication device, opening an application 630 through which the notification 635 is received, and placing a phone call to an emergency number (e.g., 911). The first stage 605 shows a graphical user interface (GUI) 600 displayed on a display of a client device (not shown), which includes several selectable user interface (UI) items (e.g., icons) of several applications in a dock area 625 of the GUI 600, as well as on a page of the GUI. One of the selectable UI items displayed on the page is a selectable UI item 630 for invoking (or opening) an application that is associated with one or more A/V recording and communication devices.

With continued reference to FIG. 6, and as illustrated in the first stage 605, the client device receives a notification message 635, which notifies a user of the client device about an event generated by an A/V recording and communication device called "Front Door" (e.g., a video doorbell installed at a front door of a house). More specifically, the notification informs the user about a person detected by the "Front Door" video doorbell. The person might have been detected by activating one or more motion sensors of the video doorbell, or by activating a doorbell button of the video doorbell.

With further reference to FIG. 6, the second stage 610 shows that the user selects the UI item 630 to open the application 630 and to view a video stream associated with the notification 635. As illustrated, the user may select the application by tapping his or her finger 680 on the UI icon 630 (e.g., through a touch contact with the client device's display at, or around, the location of UI icon 630) or through other means (e.g., using a pointing device if the client device is a laptop computer or a desktop computer). After opening the application, the third stage 615 shows a GUI 660 to the user including a first display area 640 and a second display area 670. The third stage 615 shows that a video stream is transmitted to the client device and played back in the first display area 640 of the GUI 660. The video may be played directly after opening the application 630 when, for example, the event associated with the video (e.g., the event for which the notification 635 is received) is a live event (e.g., the event for which the notification 635 is received is still in progress).

Although not shown in FIG. 6, in some aspects of the present embodiments, a user may also view the video stream associated with the notification 635 by simply selecting the notification when it is displayed on the display of the client device. That is, when the notification 635 appears on the display (at stage 605), the user may select the notification 635 (e.g., by tapping or clicking on the notification), which may result in automatic execution of the application 630, transmitting the video stream to the client device, and playing the video stream in the display area 640 of the GUI 660 on the client device, as shown in the third stage 615.

The third stage 615 of FIG. 6 also shows that the second display area 670 of the GUI 660 includes a first control button 645 for retrieving and/or displaying the information of a local police department, a second control button 650 for transmitting the presented video stream to a law enforcement agency, and a third control button 655 for calling the police emergency number. In alternative embodiments, the GUIs shown in stages 605-615 of FIG. 6, and/or any other GUI shown in FIGS. 7 and 8 below, may include one or more other display areas and/or control buttons that are not shown in FIG. 6 for simplicity of the description. For example, the GUI shown in stage 615 may include a back/cancel button for returning to the previous screen, a tag button for tagging the person shown in the video, etc.

With further reference to the third stage 615 of FIG. 6, when the user sees a suspicious person or suspicious activity in the video stream recorded by an A/V recording and communication device, or for any other reason, the user may select any of the control buttons 645-655 to receive a local police department's contact information (the first control button 645), transmit the video footage to a law enforcement authority (the second control button 650), or place an emergency call (the third control button 655). The third stage 615 shows that the user is selecting the button 650 to directly call the police emergency number (e.g., a local 911 center that serves the region/area in which the "Front Door" video doorbell (or the property at which this video doorbell is installed) is located).

Figure 7:
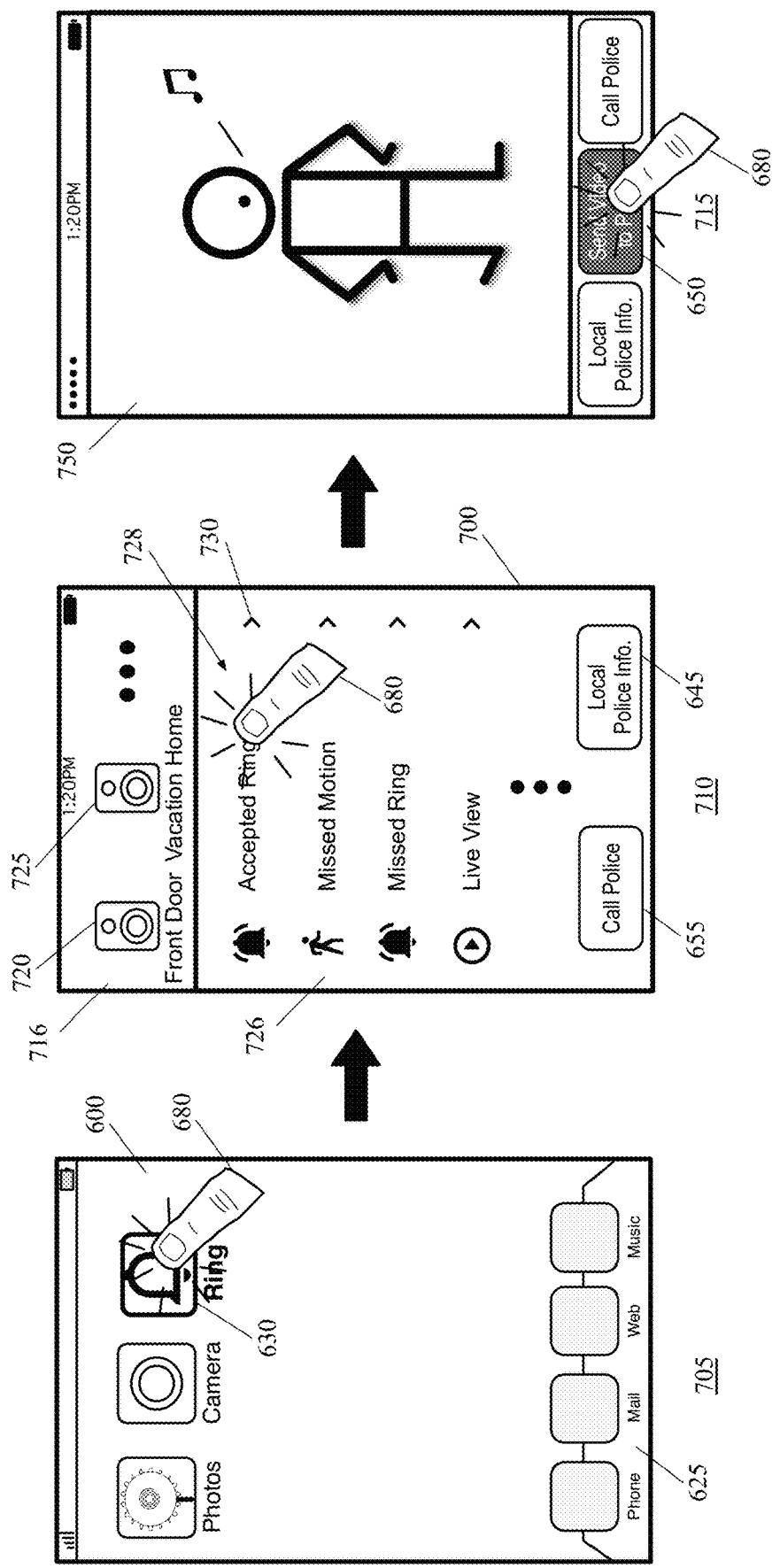
FIG. 7 illustrates an example GUI for submitting a video stream associated with a previously recorded event to a law enforcement agency while a user is viewing a video stream associated with a live event, according to some aspects of the present disclosure.

FIG. 7 illustrates an example of submitting a video stream associated with a live or previously recorded event to a law enforcement agency, while a user is viewing the video stream, according to some aspects of the present embodiments. Specifically, this figure illustrates, through three different operational stages 705-715, a user requesting contact information for a local police department and receiving the requested information. The first stage 705 of FIG. 7 illustrates the same GUI 600 shown in the first stage 605 of FIG. 6, which includes the dock area 625 and an application icon 630, among other application icons, but omits the notification 635. The first stage 705 also shows the user selecting the application icon 630 using his or her finger 680 to open the application associated with a set of A/V recording and communication devices.

With further reference to FIG. 7, after selecting the application icon 630, the second stage 710 shows that a new GUI 700 is displayed on a display of the client device. As shown in the figure, the GUI 700 includes, in a first display area 716, icons 720, 725 representing two A/V recording and communication devices, named the Front Door device and the Vacation Home device, respectively. The GUI 700 also includes, in a second display area 726, a list of events 728 that may have been generated by the two devices 720, 725, or other A/V recording and communication devices (not shown). These events may be organized chronologically, or they might be sorted based on a set of user-defined and/or system-defined rules. The second stage 710 further shows that the GUI 700 also includes two control buttons 645, 655. Selection of the first control button 645, as discussed above with reference to FIG. 6, may cause the application to show contact information of a local police department, while selection of the second button 655 may cause the application to place a direct emergency call (e.g., to law enforcement and/or other emergency responders such as a fire department). As discussed above, the GUI 700 may include several other options and/or control buttons that are not shown in the figure to simplify the description. The second stage 710 also shows that the user selects (using his or her finger 680) the first event 730 in the list of events 728 (labeled "Accepted Ring" 730), e.g., generated by the Front Door video doorbell 730, to watch the video footage associated with the event 730.

With further reference to FIG. 7, the third stage 715 shows that after selecting the event 730 in the second stage 710, the video footage 750 is presented to the user on the display of the client device. The third stage 715 also shows the user selecting the button 650 (using his or her finger 680) to transmit the video footage 750 (or one or more video images of the video footage) to the law enforcement authorities (e.g., to one or more servers that are assigned by a law enforcement agency for this purpose).

In the above illustrated example, after seeing a suspicious person in the video 750, the user sends the video to the police directly from the application executing on the client device. In some of the present embodiments, however, a person or object appearing in a video stream may automatically be recognized (e.g., through one or more computer vision processes) and automatically reported to one or more law enforcement agencies (without user intervention). For example, a video may be analyzed by an A/V recording and communication device that recorded the video (and/or by one or more backend servers) to determine whether the video contains a known criminal (e.g., convicted felon, sex offender, person on a "most wanted" list, etc.) or a suspicious person. Some of the present embodiments may automatically submit such a video stream to the law enforcement agencies. Some other embodiments may notify the user about the identified person and provide the user with the option to submit the video footage (e.g., by selecting the button 650).

The present embodiments contemplate various methods for determining that a person is a suspicious person. For example, in some aspects of the present embodiments, when a person at, or near, a property engages in a suspicious activity, the process may tag the person as a suspicious person. One example of a suspicious activity is loitering. Another form of suspicious behavior that can be identified by some of the present embodiments is carrying a suspicious object, such as a weapon or a burglary tool (e.g., a crowbar). Another form of suspicious behavior is intentionally obscuring, or partially obscuring, a visitor's face, so that it cannot be seen or recognized by the A/V recording and communication device 100, 130, 330. In some aspects of the present embodiments, a person may be determined to be a suspicious person, regardless of the type of activity in which they are engaged, when the person is identified by matching with identification data from one or more sources (e.g., using facial recognition or other biometric matching, computer vision, etc.).

Figure 8:
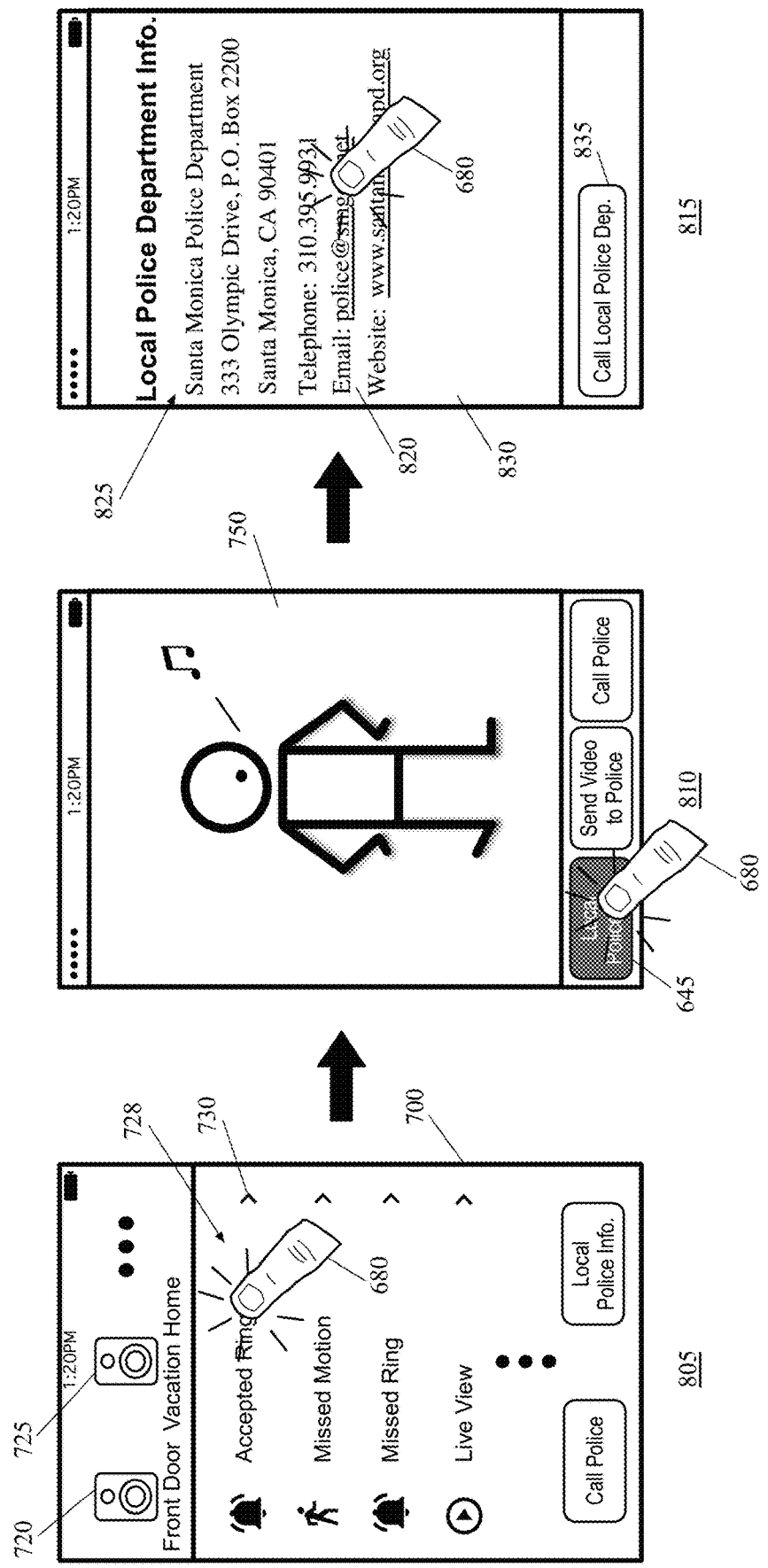
FIG. 8 illustrates an example GUI for requesting information for a local law enforcement agency while a user is viewing previously recorded video footage related to a past event, according to some aspects of the present disclosure.

FIG. 8 illustrates an example of requesting information for a local law enforcement agency, while a user is viewing a live event or previously recorded video footage related to a past event, according to some aspects of the present embodiments. Particularly, this figure illustrates, through three different operational stages 805-815, a user requesting contact information for a local police department and presenting the requested information. The first stage 805 of FIG. 8 illustrates the same GUI 700 that is shown at stage 710 of FIG. 7. The GUI 700 includes the two A/V recording and communication devices 720, 725, as well as the list of events 728 generated by these two devices (and, in some embodiments, other devices not shown in the figure).

With reference to FIG. 8, the first stage 805 also shows that the user selects, using his or her finger 680, the Accepted Ring event 730 to view the video footage associated with this event 730. The second stage 810 shows the video footage 750 being presented to the user on the display of the client device after selecting the event 730. The second stage 810 also shows the user selecting, using his or her finger 680, the button 645 to receive the contact information for a local police department. After selecting the local police information button 645, the third stage 815 shows a GUI 830 of the application, which includes (in different display areas) the contact information 825 of the local police department, including an email address link 820 for the local police department, and a control button 835 for calling the police department directly from the application executing on the client device. The third stage 815 also shows that the user selects the email address link 820 (using the user's finger 680) to send an email to the police department. Some of the present embodiments may automatically attach the video footage 750 (or one or more video images of the video footage 750) to the email that the user sends to the police department. The user may also select the control button 835 to place a direct call to the local police department (e.g., to the telephone number shown in the contact information 825 of the police department), while the contact information 825 is shown to the user. Other embodiments may provide the control button 835 in other GUIs (e.g., the GUI 700 of the first stage 805) of the application as well.

As described above, FIG. 8 illustrates one example embodiment for receiving the contact information for a law enforcement agency. In another example embodiment, a user may also request police contact information by selecting the control button 645 in the first stage 805. Some other embodiments may display all or a part of the local police information (e.g., a website address, a phone number, etc.) in a separate display area, and without receiving a request for such information. For example, some embodiments may present a part of the information in a display area of GUI 700 (shown at stage 805). Additionally, some embodiments may present other information, instead of, or in conjunction with, the information shown in the GUI 830 (shown at stage 815). For example, the information, in some aspects of the present embodiments, may include an incident report generated by the local police department, phone numbers for different sections of the local police department, etc.

Figure 9:
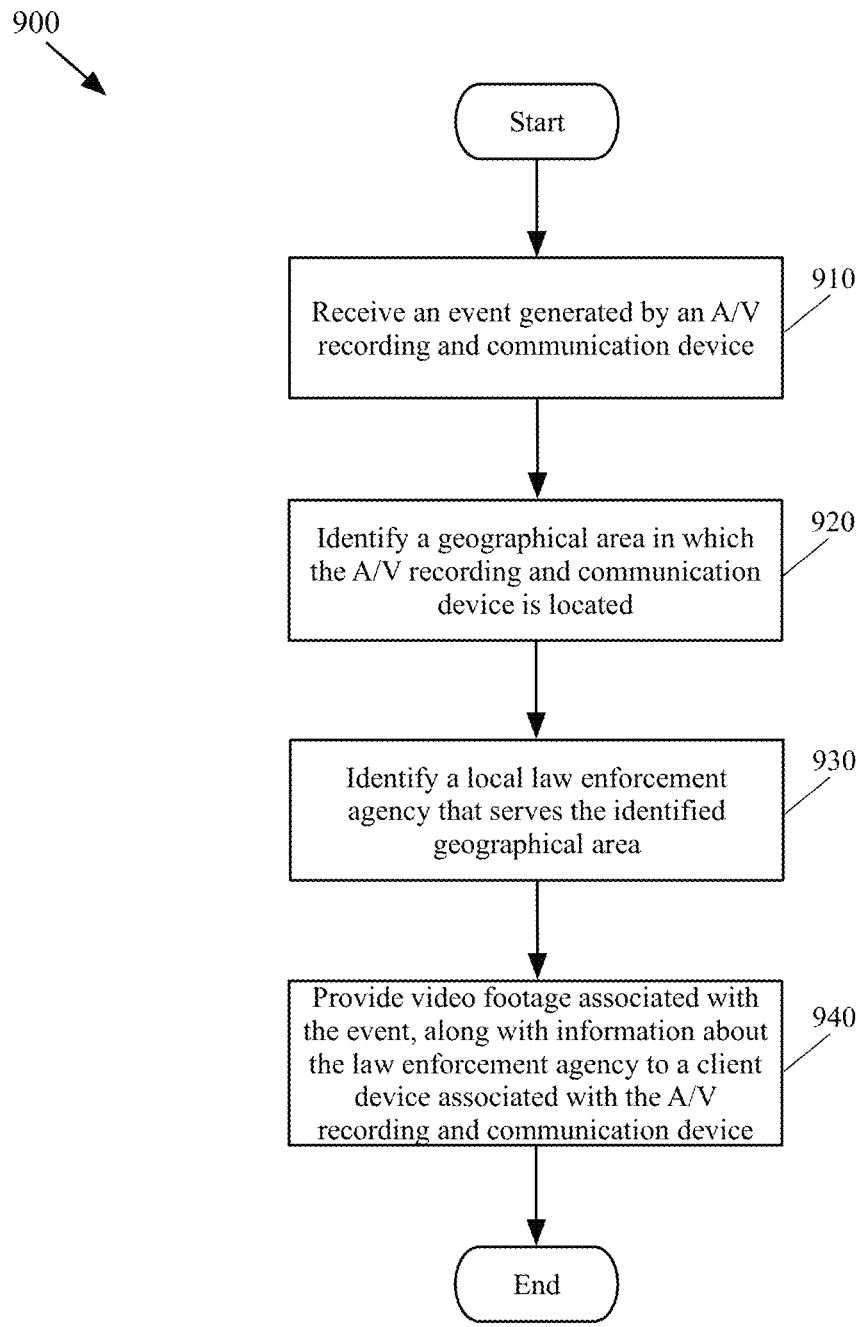
FIG. 9 is a flowchart illustrating a process that receives an event from an A/V recording and communication device and provides information for a local law enforcement agency to a client device associated with the A/V recording and communication device, according to various aspects of the present disclosure.

FIG. 9 is a flowchart illustrating a process 900 that receives an event from an A/V recording and communication device and provides information for a local law enforcement agency to a client device associated with the A/V recording and communication device, according to various aspects of the present embodiments. In some of the present embodiments, the process 900 may be performed by one or more backend devices, such as the backend server 118 and/or the backend API 120 (FIG. 1). With reference to FIG. 9, the process 900 initiates at block 910 by receiving, from an A/V recording and communication device, an event that is generated by the A/V recording and communication device. As described above, the event might have been generated when presence of a person and/or object at, or near, the A/V recording and communication device is detected.

With further reference to FIG. 9, at block 920, the process 900 identifies a geographical area in which the A/V recording and communication device is located. As described above, an A/V recording and communication device may be associated with (or installed at) a property that is located in a particular area/region (e.g., a neighborhood, a town, a city, a municipality, a county, a state, etc.). When the process 900 receives an event generated by an A/V recording and communication device, the process determines the location of the device by identifying the location of the property at which the device is installed. In various embodiments, the location of the A/V recording and communication device may be stored at a backend device, such as a cloud server, at the time the device is setup. For example, during the setup process, the user may enter a street address at which the device is installed into an application executing on a client device. In such embodiments, the aspect of determining the device's location at block 920 may comprise retrieving the stored address from the cloud server (or other backend device at which the address is stored). In other embodiments, the location of the A/V recording and communication device may be determined using any locating technology now known or later developed, such as GPS (Global Positioning System) technology.

With further reference to FIG. 9, after identifying the geographical location of the A/V recording and communication device, some of the present embodiments may identify, at block 930, one or more local law enforcement agencies (e.g., a local police and/or sheriff's department) that serves the identified geographical area. At block 940, the process 900 may provide the video stream associated with the received event, along with information about the identified law enforcement agency (e.g., the contact information for the local police department), to a client device associated with the A/V recording and communication device from which the event is received. The process then ends.

The specific operations of the above-described process 900 may not be performed in the order shown and described. Furthermore, the specific operations may not be performed in one continuous series of operations, and different specific operations may be performed in different embodiments. For example, when no local law enforcement agency that serves the identified geographical area is found (at block 930), some aspects of the present embodiments may identify a closest law enforcement agency that serves a neighboring geographical area (e.g., a city or county next to the city or county in which the A/V recording and communication device is located). Additionally, a process 900 of some embodiments, in addition to identifying a local law enforcement agency that serves the identified geographical area (at block 930), may also identify a local 911 call center that serves the geographical area, and may provide this information, along with the information for the local police department, to the client device (at block 940).

As described above, another aspect of the present embodiments includes the realization that a property associated with one or more A/V recording and communication devices may also be protected by a home security/alarm system. In at least some implementations, the A/V recording and communication device(s) may communicate with, and/or be integrated into, the home security/alarm system (e.g., through wireless and/or wired networks). When a user receives a remote notification, on a client device, from the A/V recording and communication device, streaming video associated with the notification may show the user that an emergency situation, such as an imminent break-in, is unfolding at the property where the A/V recording and communication device is located. The user may then make a call to an emergency call center, such as a 911 dispatch center or a police department, in order to summon law enforcement to the property. As the break-in progresses, however, the home security/alarm system may be triggered (e.g., when the burglar(s) kicks in the front door). The home security/alarm system may be configured to automatically call emergency services when a break-in or other emergency is detected. If the user has already called emergency services after receiving the notification from the A/V recording and communication device, then the call automatically made by the home security/alarm system is redundant. Redundant calls to emergency services to report the same incident unnecessarily burden emergency services, especially when it is not immediately apparent to the emergency services dispatcher(s) that the second call (from the home security/alarm system) relates to the same incident already reported by the user.

Some aspects of the present embodiments solve this problem by facilitating communication among A/V recording and communication devices, home security/alarm systems, and a monitoring center that monitors the home security/alarm system installed at the property. In particular, the present embodiments enable suppression of redundant communications to an emergency call center (e.g., redundant calls made by the monitoring center and/or by a user of one or more A/V recording and communication devices installed at the same property). For example, when the user of the A/V recording and communication device(s) requests a phone call to be made to an emergency call center (e.g., directly from an application executing on a client device that is associated with the A/V recording and communication device(s)), some of the present embodiments may communicate with the home security/alarm system monitoring center (i) to inform the monitoring center that the user is contacting the emergency call center, (ii) to determine whether the monitoring center has already contacted the emergency call center, and (iii) to inform the user if the monitoring center has already contacted the emergency call center. Some aspects of the present embodiments may send a notification to the user if the monitoring center has already contacted the emergency call center and may request an acknowledgment from the user before placing the phone call to the emergency call center (when the user has requested that such a call be placed).

Figure 10:
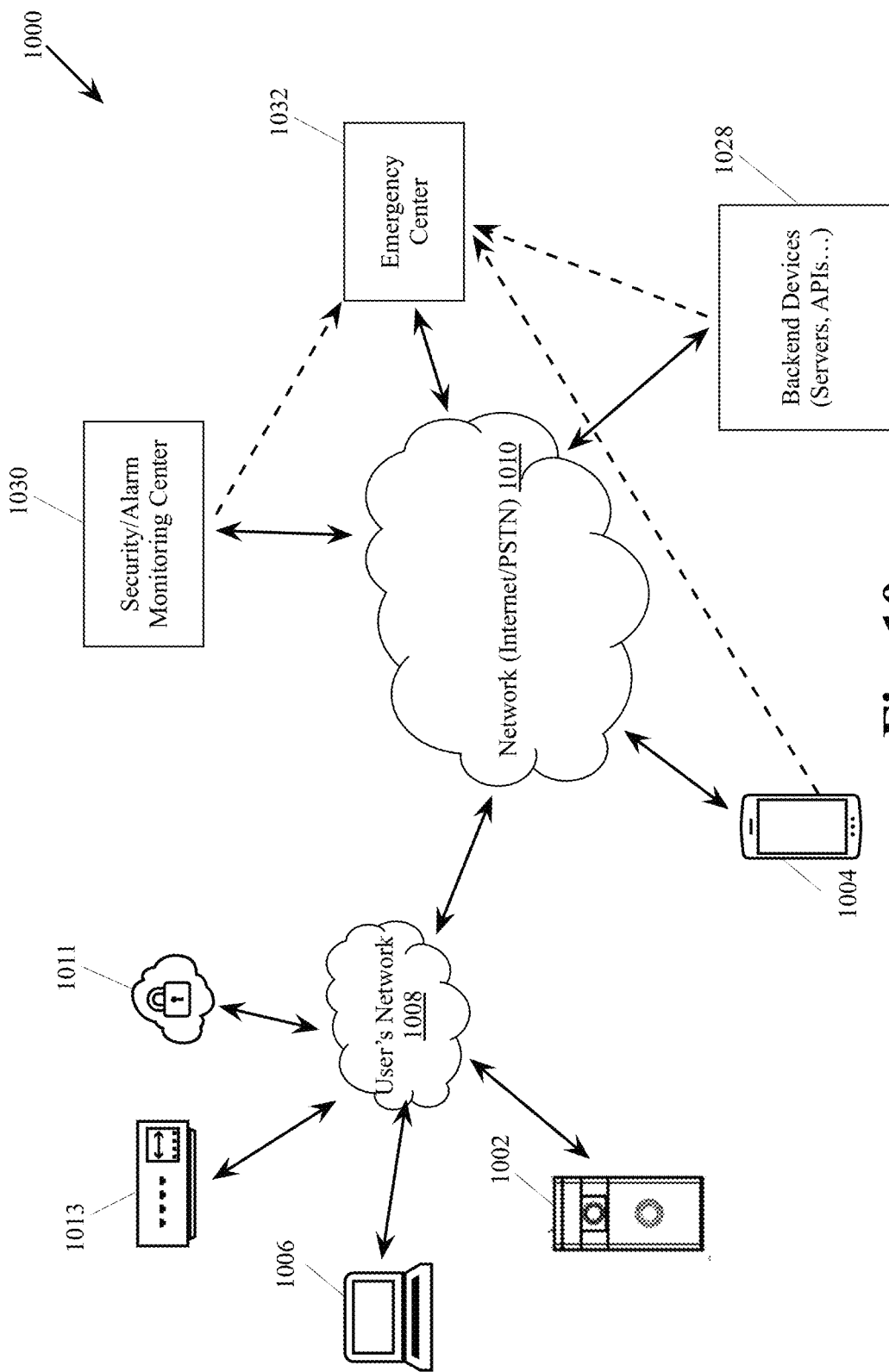
FIG. 10 is a functional block diagram illustrating a system for communication between backend devices associated with one or more A/V recording and communication devices and an alarm center monitoring one or more alarm system devices, according to various aspects of the present disclosure.

FIG. 10 is a functional block diagram illustrating a system 1000 that enables communication between one or more backend devices 1028 associated with one or more A/V recording and communication devices 1002, and a security/alarm monitoring center 1030 monitoring one or more home security systems 1011 including one or more alarm system devices 1013. Such communication facilitates prevention of redundant calls to an emergency call center, such as the emergency call center 1032.

With reference to FIG. 10, the system 1000 may include one or more A/V recording and communication devices 1002 configured to access a user's network 1008 to connect to a network (Internet/PSTN) 1010. The system 1000 may also include one or more client devices 1004, 1006, which in various embodiments may be configured to be in network communication with the A/V recording and communication device 1002 through the networks 1008 and 1010. The client devices 1004, 1006 may comprise, for example, a mobile phone such as a smartphone, or a computing device such as a tablet computer, a laptop computer, a desktop computer, etc. The client devices 1004, 1006 may include any or all of the components and/or functionality of the client device 114 (FIG. 1) and/or the client device 850 (FIG. 12) described herein. In some embodiments, the client devices 1004, 1006 may not be associated with an A/V recording and communication device. In some embodiments, the A/V recording and communication device 1002 may be similar in structure and/or function to the A/V recording and communication devices 100, 130, and 330 (FIGS. 1-3).

With further reference to FIG. 10, the system 1000 may also include a security system 1011 that may communicate with the A/V recording and communication device 1002 and/or the client devices 1004, 1006. For example, the security system 1011 may include one or more control panels (not shown) and various sensors and/or detectors (not shown). In various embodiments, the sensors and/or detectors may include motion sensors, door and window sensors, glass-break sensors, etc. for monitoring and detecting unauthorized entry into a structure and/or area, and/or sensors for monitoring and detecting abnormal conditions, such as smoke detectors, carbon monoxide sensors, moisture sensors, etc. The control panel(s) and the sensors may use one or more wireless and/or wired protocols to communicate with each other and/or with a security monitoring center 1030. In some embodiments, the security system 1011 may be armed or disarmed using the client devices 1004, 1006 and/or using the control panel(s).

With further reference to FIG. 10, the system 1000 may further include a smart-home hub device 1013. The smart-home hub (also known as a home automation hub) device 1013, may comprise any device that facilitates communication with and control of the security system 1011, the A/V recording and communication device 1002, and/or any other smart devices that are not shown in this figure (e.g., smart light bulbs, smart door locks, etc.). For example, the smart-home hub may be a component of a home automation system. Home automation, or smart home, is building automation for the home. It involves the control and automation of various devices and/or systems, such as lighting, heating (such as smart thermostats), ventilation, air conditioning (HVAC), and security, as well as home appliances, such as washers/dryers, ovens, or refrigerators/freezers. Wi-Fi is often used for remote monitoring and control. Smart home devices, when remotely monitored and controlled via the Internet, may be considered to be components of the Internet of Things. Smart home systems may include switches and/or sensors connected to a central hub, sometimes called a gateway, from which the system may be controlled with a user interface. The user interface may include any or all of a wall-mounted terminal, mobile phone (e.g., smartphone) software, a tablet computer or a web interface, often but not always via Internet cloud services. The home automation system may use one or more communication protocols, including either or both of wired and wireless protocols, including but not limited to X10, Ethernet, RS-485, 6LoWPAN, Bluetooth LE (BLE), ZigBee, and Z-Wave.

The security system 1011 may communicate directly with the smart-home hub device 1013 and/or the A/V recording and communication device 1002 (and/or any other smart home devices) using, for example, a wired protocol or a short-range wireless protocol. Alternatively, or in addition, the security system 1011 may communicate with any device in the system 1000, including the smart-home hub device 1013, through the user's network 1008. The user may control the security system 1011 through the smart-home hub device 1013 using either or both of the client devices 1004, 1006. For example, the user may control the security system 1011 using an application executing on the client device 1004, which may be, for example, a smartphone. In some embodiments, the user may control the A/V recording and communication device 1002 using either or both of the client devices 1004, 1006. Additionally, the user may control the A/V recording and communication device 1002 through the smart-home hub device 1013 (e.g., using either or both of the client devices 1004, 1006).

With further reference to FIG. 10, the system 1000 may also include various backend devices 1028 such as (but not limited to) storage devices (e.g., storage device 116 described above with reference to FIG. 1), backend servers (e.g., backend server 118), and backend APIs (e.g., backend API 120) in network communication with the A/V communication device 1002 and the client devices 1004, 1006. In some embodiments, the storage devices may be separate from the backend servers or may be an integral component of the backend servers. In addition, the user's network 1008 and the network 1010 may be similar in structure and/or function to the user's network 110 and the network 112 (FIG. 1), respectively. The user's network may comprise any wired and/or wireless network(s), such as any of the networks described herein, including, but not limited to, Ethernet, Wi-Fi, ZigBee, and Z-Wave networks. Alternatively, or in addition, the user's network 1008 may comprise various networks such as a cellular/mobile network, a local network, a public network, a low-bandwidth network, and/or any other appropriate network.

In some alternative embodiments, the security monitoring center 1030 may not be a separate entity different from the backend devices 1028. For example, in some of the present embodiments, the backend device(s) 1028 may monitor the home security system 1011 (and other security systems not shown in the figure) in addition to managing the A/V recording and communication device 1002 (and other A/V recording and communication devices not shown in the figure). In some such embodiments, there may be no communication between the backend devices 1028 and the separate security monitoring center 1030 in order to determine whether a call has been placed to the emergency call center 1032 (because the backend devices 1028 and the security monitoring center 1030 may be one and the same facility/entity/service). Instead, the same backend devices 1028 may determine to call the emergency call center 1032 immediately after receiving a request from the user (e.g., from the client device 1004) and without having to exchange contact status signal and/or other signals with a separate entity.

With further reference to FIG. 10, the system 1000 may also include the emergency call center 1032. The emergency call center 1032 may include a local 911 call center that serves a region in which the security system 1011 and the A/V recording and communication device 1002 are located. The emergency call center 1032 may be reached by the client device 1002, the security monitoring center 1030, and/or the backend devices 1028 directly (e.g., using a PSTN) or indirectly (e.g., through the network 1010). As described above, the system 1000 may also include the security/alarm monitoring center 1030 that monitors the home security system 1011 (and other security systems not shown in the figure).

As described above, some aspects of the present embodiments provide an option (e.g., a panic button) in an application executing on a client device that is associated with the A/V recording and communication device 1002 (and with other devices, such as the hub 1013 and the security system devices 1011) to contact an emergency call center directly from the application. For example, if the user becomes aware of an intrusion (e.g., while watching, on the client device 1004, a video corresponding to a motion detection event generated by the A/V recording and communication device 1002) at a property at which the A/V recording and communication device 1002 and the home security system 1011 are installed, the user may activate the panic button to place a call to the emergency call center 1032 and report the intrusion. Around the same time, the intrusion may trigger one or more security devices of the security system 1011, which may result in the security monitoring center 1030 receiving an intrusion alert from the security system 1011.

In order to prevent the user and the security monitoring center 1030 from making redundant calls to the emergency call center 1032 (e.g., to report the same incident), some of the present embodiments may send a signal to the security monitoring center 1030 (e.g., to one or more servers of the monitoring center) to notify the monitoring center about the user's contact with the emergency call center 1032. Conversely, some aspects of the present embodiments may notify the user of a communication between the emergency call center 1032 and the alarm monitoring center 1030, when the user activates the panic button (e.g., if the alarm monitoring center 1030 contacted the emergency call center 1032 to report the same incident first).

For example, when the backend device(s) 1028 receive(s) a request signal from the client device 1004 to contact the emergency call center 1032, the backend device(s) 1028 may send a signal (e.g., through the network 1010) to the security monitoring center 1030 to notify the monitoring center 1030 of the user's request. The monitoring center 1030, after receiving the notification from the backend device(s) 1028, may suppress any potential future call to the emergency call center 1032 that might otherwise result when the security system 1011 notifies the monitoring center 1030 of an intrusion event (or any other event or condition that the security system 1011 is configured to monitor and report on). Alternatively, when the backend device(s) 1028 sends the signal to the security monitoring center 1030 to notify the monitoring center 1030 of the user's request to contact the emergency call center 1032, the emergency call center 1032 may have already received a communication from the monitoring center 1030 about the same event (e.g., as a result of the security system 1011 contacting the monitoring center 1030 after detecting the intrusion (or whatever other type of event or condition that caused the user to request that the backend device(s) 1028 contact the emergency call center 1032)). The monitoring center 1030 may thus send a signal to the backend device 1028 informing the backend device 1028 that the monitoring center 1030 has already contacted the emergency call center 1032 (e.g., for the same incident).

In some aspects of the present embodiments, when the backend device 1028 determines that a call to the emergency call center 1032 has already been placed by the monitoring center 1030, the backend device 1028 may send a signal back to the client device 1004 to inform the user that the emergency call center 1032 has already been notified of the event detected by the A/V recording and communication device 1002. The user may then decide to continue with the call to the emergency call center 1032, or forgo the call. However, if the backend device 1028 determines that the monitoring center 1030 has not already made any call to the emergency call center 1032, the backend device 1028 may connect the client device 1004 to the emergency call center 1032. In some alternative embodiments, the backend device 1028 may send a signal (e.g., when no call has been made by the monitoring center 1030) to the client device 1004 to let the device switch from the application that runs on the client device 1004, and that is associated with the A/V recording and communication device 1002, to a phone application and dial the emergency call center's number (e.g., 911).

Figure 11:
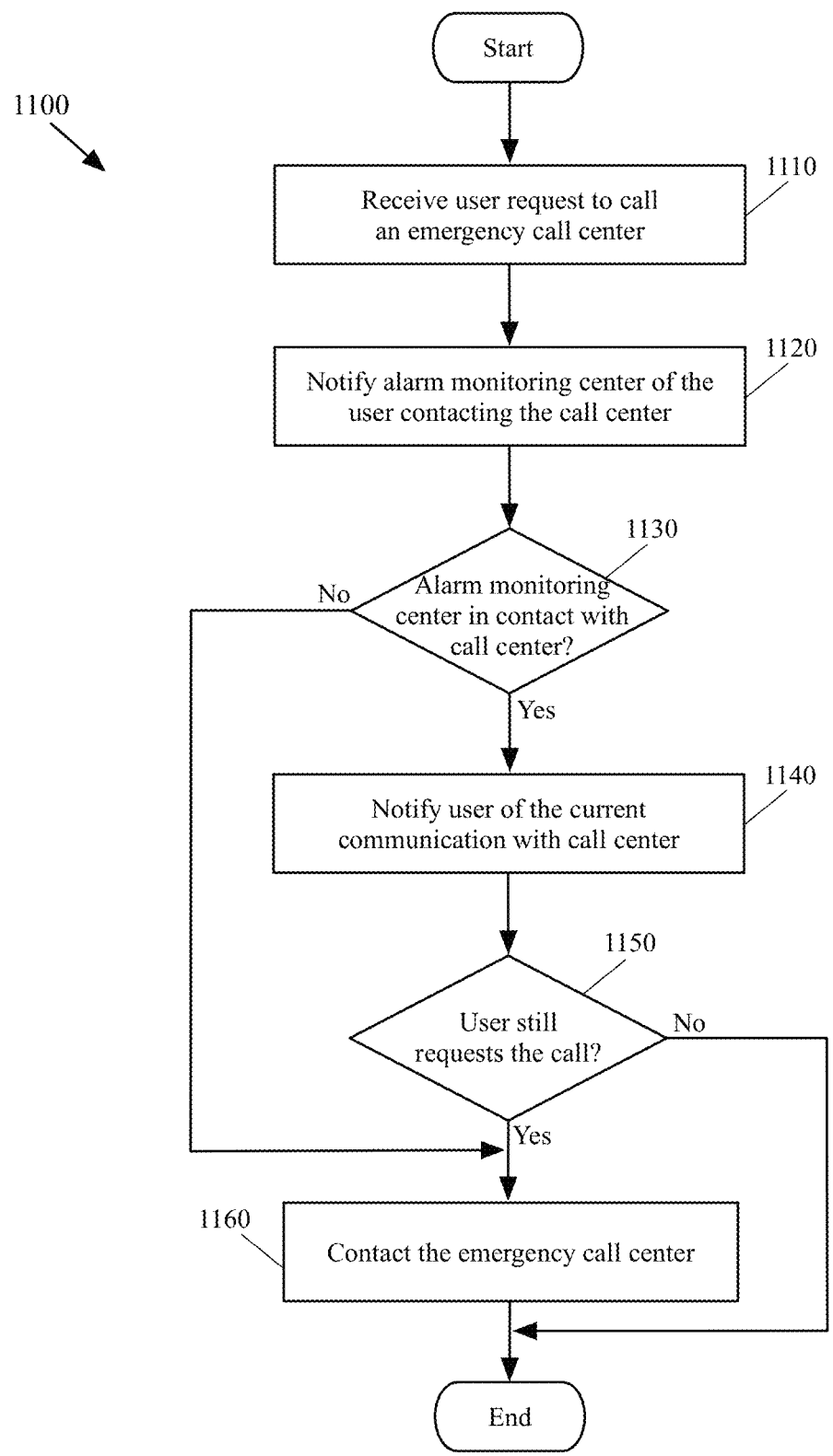
FIG. 11 is a flowchart illustrating a process for preventing redundant calls to an emergency call center by a user of one or more A/V recording and communication devices and/or by an alarm monitoring center, according to various aspects of the present disclosure.

FIG. 11 is a flowchart illustrating a process 1100 for preventing redundant calls from being made to an emergency call center by a user of one or more A/V recording and communication devices and by a monitoring center of a home security/alarm system, according to the present embodiments. In some of the present embodiments, the process 1100 may be performed by one or more backend devices entirely, while in other embodiments one or more parts of the process may be performed by a client device. The process 1100 starts at block 1110 by receiving a user request to place a call to an emergency call center. In some of the present embodiments, when a user selects an emergency control button in an application executing on a client device that is associated with one or more A/V recording and communication devices, the application may send a request signal to a backend device (e.g., a server).

After receiving the request signal, the backend device may notify (at block 1120) an alarm monitoring center that monitors a security system associated with the A/V recording and communication device(s) about the request. In some of the present embodiments, in response to receiving such a notification, the monitoring center (e.g., one or more servers associated with the center) may be configured to send a response signal back to the backend server to inform the backend server about a call status between the monitoring center and the emergency call center. That is, the monitoring center may send a signal in which the center notifies the backend server of whether or not the monitoring center has already contacted the emergency call center. In some of the present embodiments, the monitoring center may be configured such that the signal may inform the backend sever that the monitoring center has been in contact with the emergency call center only when at least one call to the emergency call center has been made within a certain threshold period of time in the past, such as, for example, within the past minute, or within the past two minutes, or within the past five minutes, or within any other length of time.

With further reference to FIG. 11, the process 1100 may determine (at block 1130) whether the security monitoring center is currently in contact (or has been recently in contact) with the emergency call center (e.g., from the contact status signal received from the security monitoring center). When the process 1100 determines that the security monitoring center has not made any contact with the emergency call center within the threshold period of time in the past, the process may proceed to block 1160, which is described below. However, when the process determines that the security monitoring center has been in contact with the emergency call center within the threshold period of time in the past, the process 1100 may notify (at block 1140) the user of such a contact. That is, the process may send a notification to the client device of the user to inform the user that the monitoring center has received an incident signal or report from the home security system and has already contacted the emergency call center. The notification, in some of the present embodiments, may also request an acknowledgment from the user to indicate whether or not the user wishes to proceed with the emergency call despite being notified that the monitoring center has already contacted the emergency call center.

At block 1150, the process 1100 may determine whether the user still wishes to proceed with the call to the emergency call center. When the process determines that the user does not wish to place the call any more, the process ends. However, when the process determines that the user still wishes to place the call to the emergency call center, the process 1100 may contact (at block 1160) the emergency call center (e.g., a local 911 center). The process then ends.

The specific operations of the process 1100 may not be performed in the exact order shown and described. For example, in some aspects of the present embodiments, the process 1100 may contact the emergency call center without performing the operations described with reference to blocks 1140 and 1150. For example, when the process 1100 determines (at block 1130) that the alarm monitoring center has been in contact with the emergency call center, the process may still place a call for the user to the emergency call center, without notifying the user, or receiving an acknowledgment from the user. Furthermore, in some aspects of the present embodiments, the process 1100 may send a notification (at block 1140) to the client device (or may place a call to the client device when the client device is a smartphone), when the process determines that the security monitoring center contacted the call center (at block 1130), irrespective of receiving a call request (at block 1110) from the client device. In yet other embodiments, the process 1100 may send a notification (at block 1140) to the client device (or may place a call to the client device when the client device is a smartphone), when the process determines that the security monitoring system has received a trigger alert from one of the home security system devices, irrespective of the security monitoring system contacting an emergency call center. For example, one aspect of the present embodiments may send a notification to a client device of a user each time an alert is received from a sensor of the home security system associated with the A/V recording and communication device(s).

Additionally, the specific operations of the process 1100 may not be performed in one continuous series of operations, and different specific operations may be performed in different embodiments. For example, in some aspects of the present embodiments, the process 1100 may not contact the emergency call center directly (at block 1160). Instead, the process of some of the present embodiments may send a signal to the client device to let the client device know that a call to the emergency call center may be made. In some such embodiments, the client device may switch, from the application that received the emergency call request from the user, to a phone application and dial the number of the emergency call center.

Furthermore, in some alternative embodiments, the security monitoring center may not be a separate entity, different from the backend devices. That is, some of the present embodiments may use the same set of backend devices that manages, and communicates with, the A/V recording and communication device(s) to monitor the home security system(s). In some such embodiments, the process 1100 may not send signals to (or receive signals from) a different server to notify (or to receive contact status from) other servers belonging to a security monitoring center. Therefore, the process 1100 of some embodiments may receive the user request (at block 1110) to contact an emergency call center and in response, either make the contact (e.g., without consulting a monitoring center), or notify the user that a call has already been made.

Figure 12:
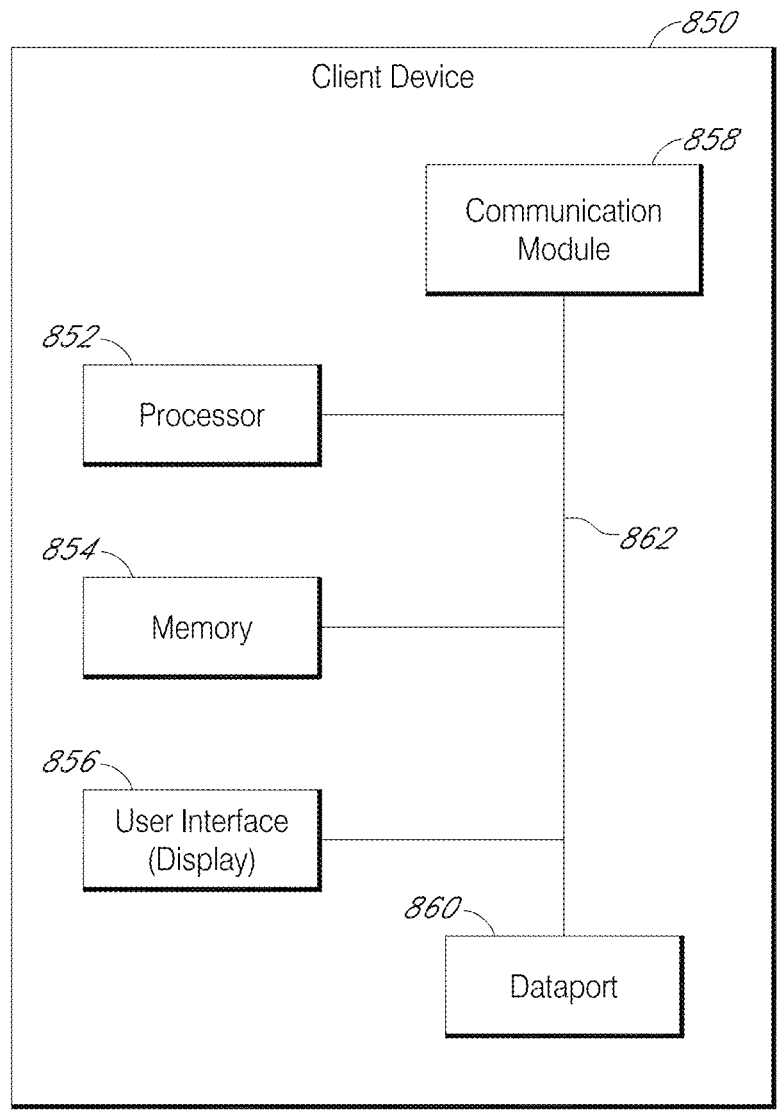
FIG. 12 is a functional block diagram of a client device on which the present embodiments may be implemented, according to various aspects of the present disclosure.

FIG. 12 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a smartphone.

With reference to FIG. 12, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM).). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 808 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 13:
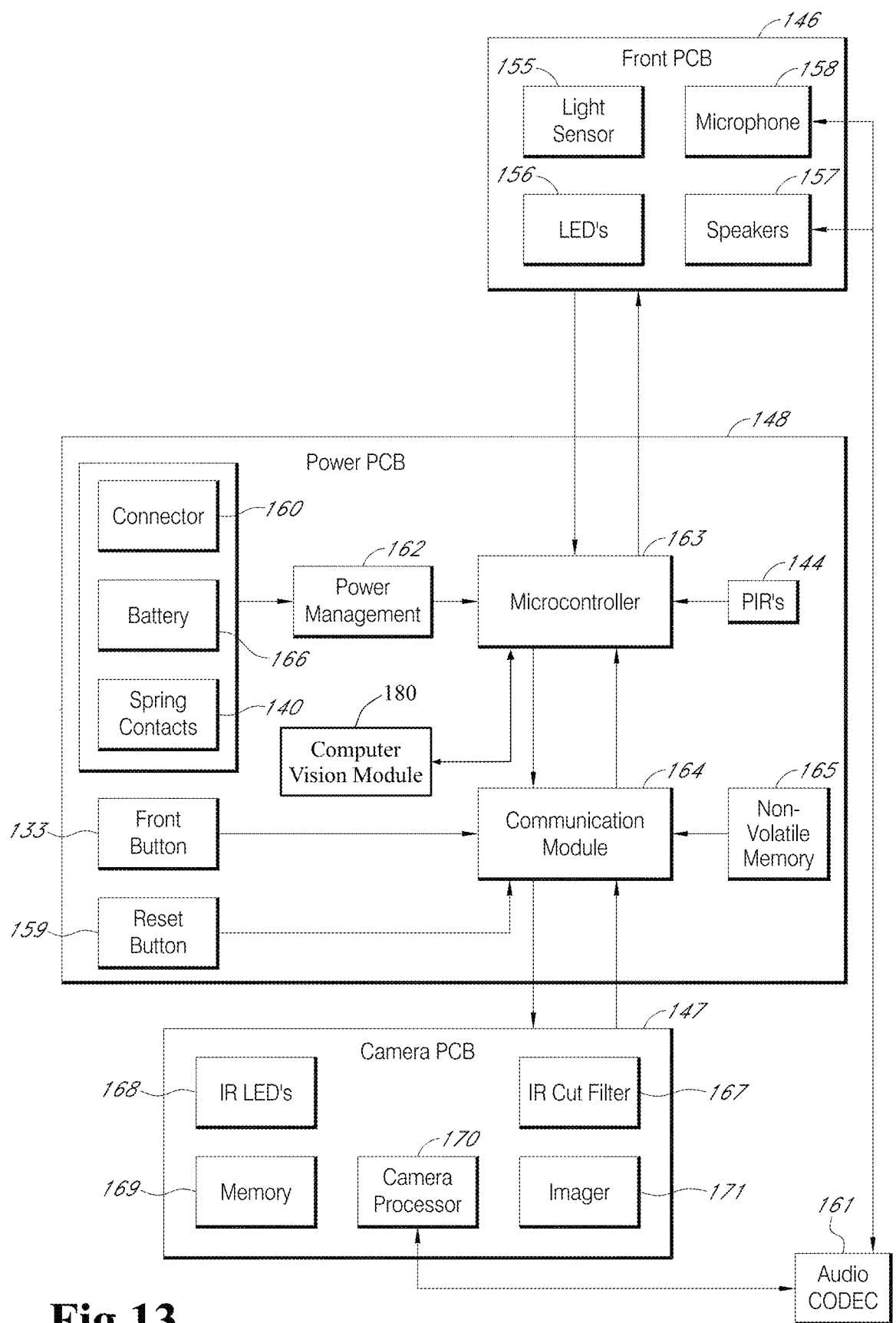
FIG. 13 is a functional block diagram illustrating an embodiment of an A/V recording and communication device, according to various aspects of the present disclosure.

FIG. 13 is a functional block diagram illustrating various components of the A/V recording and communication doorbell 130 and their relationships to one another. The A/V recording and communication doorbell 130 may include a front PCB (printed circuit board) 146 comprising a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. The LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through a communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 13, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 13, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 13, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 13, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p, or 1080p, or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

While not shown separately, the components of the A/V recording and communication security camera 330 (FIG. 3), and their relationships to one another, may be similar to, or substantially the same as, the components of the A/V recording and communication doorbell 130 described above and illustrated in FIG. 13, but without the front button 133 and its related components.

Figure 14:
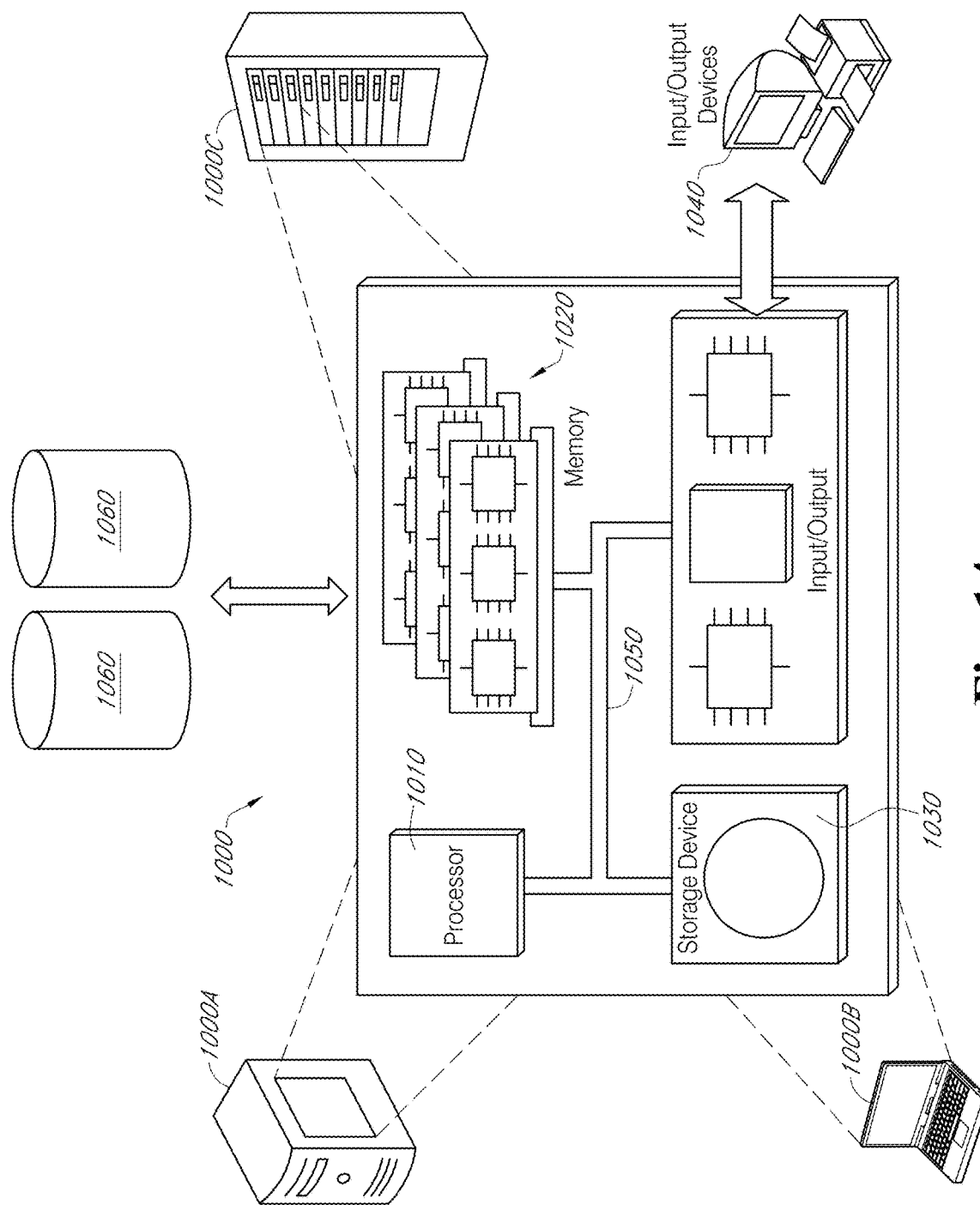
FIG. 14 is a functional block diagram of a general-purpose computing system on which the present embodiments may be implemented, according to various aspects of present disclosure.

FIG. 14 is a functional block diagram of a general-purpose computing system on which the present embodiments may be implemented according to various aspects of the present disclosure. The computer system 1000 may be embodied in at least one of a personal computer (also referred to as a desktop computer) 1000A, a portable computer (also referred to as a laptop or notebook computer) 1000B, and/or a server 1000C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1000 may execute at least some of the operations described above. The computer system 1000 may include at least one processor 1010, memory 1020, at least one storage device 1030, and input/output (I/O) devices 1040. Some or all of the components 1010, 1020, 1030, and 1040 may be interconnected via a system bus 1050. The processor 1010 may be single- or multi-threaded and may have one or more cores. The processor 1010 may execute instructions, such as those stored in the memory 1020 and/or in the storage device 1030. Information may be received and output using one or more I/O devices 1040.

The memory 1020 may store information, and may be a computer-readable medium, such as volatile or non-volatile memory. The storage device(s) 1030 may provide storage for the system 1000, and may be a computer-readable medium. In various aspects, the storage device(s) 1030 may be a flash memory device, a hard disk device, an optical disk device, a tape device, or any other type of storage device.

The I/O devices 1040 may provide input/output operations for the system 1000. The I/O devices 1040 may include a keyboard, a pointing device, and/or a microphone. The I/O devices 1040 may further include a display unit for displaying graphical user interfaces, a speaker, and/or a printer. External data may be stored in one or more accessible external databases 1060.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a GUI and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, a method for presenting, on a display of a client device, information about a law enforcement agency is provided, the method comprising displaying, on a first display area of the display of the client device, video footage associated with an event generated by an audio/video (A/V) recording and communication device, the video footage captured by a camera of the A/V recording and communication device; receiving a request for displaying information for the law enforcement agency associated with the A/V recording and communication device; and in response to the request, displaying, on a second display area of the display of the client device, the information about the law enforcement agency.

In an embodiment of the first aspect, the law enforcement agency is a local police department.

In another embodiment of the first aspect, the information about the law enforcement agency comprises contact information for the local police department.

In another embodiment of the first aspect, the A/V recording and communication device is installed at a property located within a region, and wherein the law enforcement agency serves the region.

In another embodiment of the first aspect, the region is a first region, and the client device is located within a second, different region.

In another embodiment of the first aspect, receiving the request comprises receiving a selection of a control button displayed on a third display area of the display of the client device.

In another embodiment of the first aspect, the second display area at least partially overlaps the first display area.

In another embodiment of the first aspect, the second display area does not overlap the first display area.

Another embodiment of the first aspect comprises receiving a request to transmit the video footage to law enforcement agency.

In another embodiment of the first aspect, receiving the request comprises displaying, on a third display area of the display of the client device, a control button for transmitting the video footage to the law enforcement, and receiving a selection of the control button.

In another embodiment of the first aspect, the third display area at least partially overlaps the first display area.

Another embodiment of the first aspect comprises, in response to the request, transmitting the video footage to the law enforcement.

In another embodiment of the first aspect, transmitting the video footage to the law enforcement comprises uploading the video footage to one or more servers associated with the law enforcement.

In a second aspect, a method for providing, to a client device, information for a law enforcement agency is provided, the method comprising receiving an event generated by an audio/video (A/V) recording and communication device, the event associated with video footage captured by a camera of the A/V recording and communication device; identifying a geographical area in which the A/V recording and communication device is located; identifying a law enforcement agency associated with the geographical area; and providing the video footage, along with information about the law enforcement agency, to a client device.

An embodiment of the second aspect comprises identifying one or more servers associated with the law enforcement agency, and providing the client device with a link for uploading the video footage to the identified servers.

In another embodiment of the second aspect, the law enforcement agency comprises a local police department.

In another embodiment of the second aspect, the information comprises contact information for the local police department.

In another embodiment of the second aspect, the law enforcement agency associated with the geographical area comprises a law enforcement agency that serves the geographical area.

In another embodiment of the second aspect, the client device comprises a smartphone.

In another embodiment of the second aspect, identifying a geographical area in which the A/V recording and communication device is located comprises identifying a physical address of a property at which the A/V recording and communication device is installed and identifying the geographical area based on the identified physical address.

Another embodiment of the second aspect further comprises identifying a local number for an emergency call center, and providing the local number to the client device.

In a third aspect, a method for contacting an emergency call center is provided, the method comprising receiving, at a client device, a notification, along with video footage associated with the notification, about an event generated by an audio/video (A/V) recording and communication device, the video footage captured by a camera of the A/V recording and communication device; receiving a request for contacting the emergency call center; informing a backend device of the received request to suppress a potential redundant call to the emergency call center from a home security monitoring center that monitors a security system; and contacting the emergency call center.

In an embodiment of the third aspect, the emergency call center comprises a 911 call center.

In another embodiment of the third aspect, receiving the request comprises displaying, on a display of the client device, a control button for contacting the emergency call center, and receiving a selection of the control button.

In another embodiment of the third aspect, displaying the control button comprises displaying the control button while the video footage associated with the event is played on a display area of the display of the client device.

Another embodiment of the third aspect further comprises, upon informing the backend server, receiving a notification from the backend server about a contact made to the emergency call center by the third party.

In another embodiment of the third aspect, the notification further requires an acknowledgement from a user of the client device, and wherein contacting the emergency call center comprises contacting the emergency call center after receiving the acknowledgement from the user.

In another embodiment of the third aspect, the security system is installed at a same property at which the A/V recording and communication device is installed.

In another embodiment of the third aspect, the property is located within a region, and wherein the emergency call center comprises a local 911 call center that serves the region.

In another embodiment of the third aspect, the property is located within a first region, and wherein the client device is located within a second, different region.

In another embodiment of the third aspect, the backend device comprises a backend server.

In another embodiment of the third aspect, the backend server manages the A/V recording and communication device.

In another embodiment of the third aspect, the event is generated when the A/V recording and communication device detects motion around the A/V recording and communication device.

In a fourth aspect, a method for contacting an emergency call center is provided, the method comprising receiving an event generated by an audio/video (A/V) recording and communication device, the event associated with video footage captured by a camera of the A/V recording and communication device; generating a notification about the event; transmitting the notification, along with the video footage, to a client device associated with the A/V recording and communication device; receiving a request from the client device to contact an emergency call center; determining whether a contact has already been made to the emergency call center by a home security monitoring center that monitors a security system; and contacting the emergency call center when no contact to the emergency call center has already been made by the home security monitoring center.

In an embodiment of the fourth aspect, the emergency call center comprises a 911 call center.

Another embodiment of the fourth aspect further comprises, upon receiving the request from the client device, sending a signal to the home security monitoring center for suppressing a potential redundant call to the emergency call center by the home security monitoring center.

In another embodiment of the fourth aspect, the signal further requests whether the home security monitoring center has already contacted the emergency call center.

Another embodiment of the fourth aspect further comprises sending a notification to the client device when the home security monitoring center has already contacted the emergency call center.

Another embodiment of the fourth aspect further comprises providing, in the notification, a request for acknowledgment by a user of the client device whether the user still wishes to contact the emergency call center.

Another embodiment of the fourth aspect further comprises contacting the emergency call center when the user acknowledges the request provided in the notification.

In another embodiment of the fourth aspect, the security system is installed at a same property at which the A/V recording and communication device is installed.

In another embodiment of the fourth aspect, the property is located within a region, and wherein the emergency call center comprises a local 911 call center that serves the region.

In another embodiment of the fourth aspect, the property is located within a first region, and wherein the client device is located within a second, different region.

In another embodiment of the fourth aspect, the event is generated when the A/V recording and communication device detects motion around the A/V recording and communication device.

In a fifth aspect, a method for a client device for preventing redundant calls to an emergency call center is provided, the method comprising: receiving, at the client device, a notification, along with video footage associated with the notification, about an event generated by an audio/video (A/V) recording and communication device, the video footage captured by a camera of the A/V recording and communication device; receiving a request for contacting the emergency call center; informing one or more backend devices, in communication with the client device and a home security monitoring center that monitors a security system, of the received request to suppress a potential redundant call to the emergency call center from the home security monitoring center; and contacting the emergency call center.

In an embodiment of the fifth aspect, the emergency call center comprises a 911 call center.

In another embodiment of the fifth aspect, receiving the request comprises: displaying, on a display of the client device, a control button for contacting the emergency call center; and receiving a selection of the control button.

In another embodiment of the fifth aspect, displaying the control button comprises displaying the control button while the video footage associated with the event is played on the display of the client device.

In another embodiment of the fifth aspect, the method further comprises, after informing the one or more backend devices, receiving another notification from at least one of the one or more backend devices about a contact made to the emergency call center by the home security monitoring center.

In another embodiment of the fifth aspect, the another notification further requires a user acknowledgement, and wherein contacting the emergency call center comprises contacting the emergency call center after receiving the user acknowledgement.

In another embodiment of the fifth aspect, the security system is installed at a same property at which the A/V recording and communication device is installed.

In another embodiment of the fifth aspect, the property is located within a region, and wherein the emergency call center comprises a local 911 call center that serves the region.

In another embodiment of the fifth aspect, the property is located within a first region, and wherein the client device is located within a second, different region.

In another embodiment of the fifth aspect, the or more backend devices are further in communication with a security hub device of the security system.

In another embodiment of the fifth aspect, the receiving the notification comprises receiving the notification after the A/V recording and communication device detects motion in an area about the A/V recording and communication device.

In another embodiment of the fifth aspect, the client device comprises one of a smartphone, a personal digital assistant (PDA), a tablet computer, a laptop computer, and a desktop computer.

In a sixth aspect, an electronic device comprising: a display; at least one processor; and a non-transitory machine-readable medium storing a program for preventing redundant calls to an emergency call center, the program executable by at least one processor, the program comprising sets of instructions for: receiving a notification, along with video footage associated with the notification, about an event generated by an audio/video (A/V) recording and communication device, the video footage captured by a camera of the A/V recording and communication device; displaying the video footage on the display of the electronic device; receiving a request for contacting the emergency call center; informing one or more backend devices, in communication with the electronic device and a home security monitoring center, of the received request to suppress a potential redundant call to the emergency call center from the home security monitoring center; and contacting the emergency call center.

In an embodiment of the sixth aspect, the set of instructions for receiving the request comprises sets of instructions for: displaying, on a display of the client device, a control button for contacting the emergency call center; and receiving a selection of the control button.

In another embodiment of the sixth aspect, the set of instructions for displaying the control button comprises a set of instructions for displaying the control button while the video footage associated with the event is played on the display of the client device.

In another embodiment of the sixth aspect, the notification is a first notification, and wherein the program further comprises a set of instructions for, after informing the one or more backend devices, receiving a second notification from at least one of the one or more backend devices about a contact made to the emergency call center by the home security monitoring center.

In another embodiment of the sixth aspect, the second notification further requires a user acknowledgement, and wherein the set of instructions for contacting the emergency call center comprises a set of instructions for contacting the emergency call center after receiving the user acknowledgement.

In another embodiment of the sixth aspect, the security system is installed at a same property at which the A/V recording and communication device is installed.

In another embodiment of the sixth aspect, the one or more backend devices are further in communication with a security hub device of the security system.

In another embodiment of the sixth aspect, the electronic device comprises one of a smartphone, a personal digital assistant (PDA), a tablet computer, a laptop computer, and a desktop computer.

In a seventh aspect, a computer program application for a client device associated with an audio/video recording and communication device (A/V device) is provided, the computer program application being embodied in code executable by a processor of the client device, which when executed causes the client device to: receive a notification about an event generated by the A/V device; display, on a display of the client device, the notification about the event generated by the A/V device; receive a request to view video footage associated with the event, wherein the video footage associated with the event is captured by a camera of the A/V device; display, on a display of the client device, at least a portion of the video footage associated with the event; receive a request to contact an emergency call center; and contact the emergency call center.

In an embodiment of the seventh aspect, the computer program application is embodied in further code that, when executed by the processor, further causes the client device to receive the request to view the video footage associated with the event by receiving a selection of the notification about the event generated by the A/V device.

In another embodiment of the seventh aspect, the computer program application is embodied in further code that, when executed by the processor, further causes the client device to receive the request to contact the emergency call center by: displaying, on the display of the client device, a control button for contacting the emergency call center; and receiving a selection of the control button.

In another embodiment of the seventh aspect, displaying the control button comprises displaying the control button while the video footage associated with the event is displayed on the display of the client device.

In another embodiment of the seventh aspect, the video footage associated with the event comprises video footage of a live event at the A/V device.

In another embodiment of the seventh aspect, the video footage associated with the event comprises video footage of a previously recorded event at the A/V device.

In another embodiment of the seventh aspect, the event generated by the A/V device is generated when the A/V device detects motion in an area about the A/V device.

In another embodiment of the seventh aspect, the computer program application is embodied in further code that, when executed by the processor, further causes the client device to receive a request to send the video footage associated with the event to a law enforcement agency.

In another embodiment of the seventh aspect, the computer program application is embodied in further code that, when executed by the processor, further causes the client device to receive the request to send the video footage associated with the event to the law enforcement agency by: displaying, on the display of the client device, a control button for sending the video footage associated with the event to the law enforcement agency; and receiving a selection of the control button.

In another embodiment of the seventh aspect, the computer program application is embodied in further code that, when executed by the processor, further causes the client device to send the video footage associated with the event to the law enforcement agency by uploading the video footage associated with the event to a server associated with the law enforcement agency.

In another embodiment of the seventh aspect, the computer program application is embodied in further code that, when executed by the processor, further causes the client device to receive a notification about an identified person depicted in the video footage associated with the event.

In another embodiment of the seventh aspect, the computer program application is embodied in further code that, when executed by the processor, further causes the client device to receive a request to contact a local law enforcement agency.

In another embodiment of the seventh aspect, the local law enforcement agency serves a region in which the A/V device is located.

In another embodiment of the seventh aspect, the computer program application is embodied in further code that, when executed by the processor, further causes the client device to receive a request to display contact information of the law enforcement agency by: displaying, on the display of the client device, a control button for contacting the local law enforcement agency; and receiving a selection of the control button.

In another embodiment of the seventh aspect, the computer program application is embodied in further code that, when executed by the processor, further causes the client device to contact the local law enforcement agency.

In another embodiment of the seventh aspect, the computer program application is embodied in further code that, when executed by the processor, further causes the client device to contact the local law enforcement agency by calling the local law enforcement agency.

In another embodiment of the seventh aspect, the computer program application is embodied in further code that, when executed by the processor, further causes the client device to contact the local law enforcement agency by sending an email to the local law enforcement agency.

In another embodiment of the seventh aspect, the computer program application is embodied in further code that, when executed by the processor, further causes the client device to automatically attach at least a portion of the video footage associated with the event to the email.

In another embodiment of the seventh aspect, the computer program application is embodied in further code that, when executed by the processor, further causes the client device to display, on the display of the client device, contact information of the local law enforcement agency.

In another embodiment of the seventh aspect, the contact information of the local law enforcement agency comprises at least one of a street address, a telephone number, an email address, and a web address.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A computer program application for a client device associated with an audio/video recording and communication device (A/V device), the computer program application being embodied in code executable by a processor of the client device, which when executed causes the client device to:
    receive a notification about an event generated by the A/V device;
    display, on a display of the client device, the notification about the event generated by the A/V device;
    receive a request to view video footage associated with the event, wherein the video footage associated with the event is captured by a camera of the A/V device;
    display, on a display of the client device, at least a portion of the video footage associated with the event; and
    display, on the display of the client device along with the at least a portion of the video footage, a first control button for contacting an emergency call center and a second control button for displaying contact information of a local law enforcement agency, wherein:
        upon receipt of a first selection of the first control button, the computer program application causes the client device to contact the emergency call center, and
        upon receipt of a second selection of the second control button, the computer program application causes the client device to display, on the display of the client device, contact information of the local law enforcement agency.

2. The computer program application of claim 1, wherein the computer program application is embodied in further code that, when executed by the processor, further causes the client device to receive the request to view the video footage associated with the event by receiving a selection of the notification about the event generated by the A/V device.

3. The computer program application of claim 1, wherein displaying the first and second control buttons comprises displaying the first and second control buttons while the at least a portion of the video footage associated with the event is played on the display of the client device.

4. The computer program application of claim 1, wherein the video footage associated with the event comprises video footage of a live event at the A/V device.

5. The computer program application of claim 1, wherein the video footage associated with the event comprises video footage of a previously recorded event at the A/V device.

6. The computer program application of claim 1, wherein the event generated by the A/V device is generated when the A/V device detects motion in an area about the A/V device.

7. The computer program application of claim 1, wherein the computer program application is embodied in further code that, when executed by the processor, further causes the client device to receive a request to send the video footage associated with the event to a law enforcement agency.

8. The computer program application of claim 7, wherein the computer program application is embodied in further code that, when executed by the processor, further causes the client device to receive the request to send the video footage associated with the event to the law enforcement agency by:
    displaying, on the display of the client device, a third control button for sending the video footage associated with the event to the law enforcement agency; and
    receiving a selection of the third control button.

9. The computer program application of claim 7, wherein the computer program application is embodied in further code that, when executed by the processor, further causes the client device to send the video footage associated with the event to the law enforcement agency by uploading the video footage associated with the event to a server associated with the law enforcement agency.

10. The computer program application of claim 1, wherein the computer program application is embodied in further code that, when executed by the processor, further causes the client device to receive a notification about an identified person depicted in the video footage associated with the event.

11. The computer program application of claim 1, wherein the local law enforcement agency serves a region in which the A/V device is located.

12. The computer program application of claim 1, wherein the computer program application is embodied in further code that, when executed by the processor, further causes the client device to receive a request to contact the law enforcement agency by:
    displaying, on the display of the client device, a third control button for contacting the local law enforcement agency; and
    receiving a selection of the third control button.

13. The computer program application of claim 12, wherein the computer program application is embodied in further code that, when executed by the processor, further causes the client device to contact the local law enforcement agency.

14. The computer program application of claim 13, wherein the computer program application is embodied in further code that, when executed by the processor, further causes the client device to contact the local law enforcement agency by calling the local law enforcement agency.

15. The computer program application of claim 13, wherein the computer program application is embodied in further code that, when executed by the processor, further causes the client device to contact the local law enforcement agency by sending an email to the local law enforcement agency.

16. The computer program application of claim 15, wherein the computer program application is embodied in further code that, when executed by the processor, further causes the client device to automatically attach at least a portion of the video footage associated with the event to the email.

17. The computer program application of claim 1, wherein the contact information of the local law enforcement agency comprises at least one of a street address, a telephone number, an email address, and a web address.

18. The computer program application of claim 1, wherein the computer program application is embodied in further code that, when executed by the processor, further causes the client device to determine the contact information of the local law enforcement agency based on a geographic location of a property at which the A/V device is installed.

19. The computer program application of claim 8, wherein the third control button is displayed on the display of the client device along with the first and second control buttons and the at least a portion of the video footage.

20. The computer program application of claim 12, wherein the third control button is displayed on the display of the client device after the receipt of the second selection of the second control button.

* * * * *